United States Patent
Bowman et al.

(10) Patent No.: US 10,422,468 B2
(45) Date of Patent: *Sep. 24, 2019

(54) ARTICULATING SUPPORT ARM WITH IMPROVED TILTER AND FRICTION JOINT

(71) Applicant: Innovative Office Products, LLC, Easton, PA (US)

(72) Inventors: Stephen J. Bowman, Saylorsburg, PA (US); Carl J. Hochberg, Lehighton, PA (US); Michael P. Smith, Allentown, PA (US); Mickey Lam, Easton, PA (US)

(73) Assignee: Innovative Office Products, LLC, Easton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/042,442

(22) Filed: Jul. 23, 2018

(65) Prior Publication Data

US 2018/0340644 A1    Nov. 29, 2018

Related U.S. Application Data

(63) Continuation-in-part of application No. 15/658,626, filed on Jul. 25, 2017, now Pat. No. 10,054,255, (Continued)

(51) Int. Cl.
*F16M 11/06* (2006.01)
*F16M 11/10* (2006.01)
(Continued)

(52) U.S. Cl.
CPC .......... *F16M 11/10* (2013.01); *F16C 11/103* (2013.01); *F16M 11/041* (2013.01);
(Continued)

(58) Field of Classification Search
CPC ............ F16M 11/2014; F16M 11/2064; Y10S 248/917; Y10T 16/05; Y10T 16/54033
See application file for complete search history.

(56) References Cited

U.S. PATENT DOCUMENTS

| 3,463,520 A | 8/1969 | Turro |
| 7,048,242 B2 | 5/2006 | Oddsen, Jr. |

(Continued)

OTHER PUBLICATIONS

Screenshots of 3D model of Innovative Office Products Model No. 8411 tilter device.
(Continued)

*Primary Examiner* — Bradley Duckworth
(74) *Attorney, Agent, or Firm* — Design IP

(57) ABSTRACT

The present application discloses an articulating support arm with one or more improved friction joint designs that use a non-annular bushing. In particular, the bushing is designed to interact with another portion of the friction joint to prevent rotational movement of the bushing, thereby minimizing the risk of joint malfunction. A bushing that interacts with a larger percentage of the width of a friction cylinder as compared to prior art devices, thereby improving the performance of the joint, is also disclosed. The improved friction joint according to the present invention may comprise an arm joint and/or tilter joint.

15 Claims, 16 Drawing Sheets

Related U.S. Application Data which is a continuation of application No. 15/092,173, filed on Apr. 6, 2016, now Pat. No. 9,746,125.

(60) Provisional application No. 62/149,887, filed on Apr. 20, 2015, provisional application No. 62/293,452, filed on Feb. 10, 2016.

(51) Int. Cl.

| | |
|---|---|
| *F16M 11/20* | (2006.01) |
| *F16M 11/18* | (2006.01) |
| *F16M 11/12* | (2006.01) |
| *F16M 11/08* | (2006.01) |
| *F16M 13/02* | (2006.01) |
| *F16C 11/10* | (2006.01) |
| *F16M 11/04* | (2006.01) |

(52) U.S. Cl.
CPC ........... *F16M 11/08* (2013.01); *F16M 11/105* (2013.01); *F16M 11/125* (2013.01); *F16M 11/126* (2013.01); *F16M 11/128* (2013.01); *F16M 11/18* (2013.01); *F16M 11/2014* (2013.01); *F16M 11/2021* (2013.01); *F16M 11/2064* (2013.01); *F16M 13/02* (2013.01); *F16M 2200/024* (2013.01); *F16M 2200/044* (2013.01); *F16M 2200/063* (2013.01)

(56) References Cited

U.S. PATENT DOCUMENTS

| | | |
|---|---|---|
| 7,389,965 B2 | 6/2008 | Oddsen et al. |
| 8,523,131 B2 | 9/2013 | Derry et al. |
| 8,720,838 B2 | 5/2014 | Bowman et al. |
| 8,919,716 B2 | 12/2014 | Oddsen et al. |
| 8,931,748 B2 | 1/2015 | Bowman et al. |
| 9,746,125 B2 | 8/2017 | Bowman et al. |
| 10,054,255 B2 * | 8/2018 | Bowman ................ F16M 11/10 |
| 2004/0251389 A1 | 12/2004 | Oddsen, Jr. |
| 2006/0060735 A1 | 3/2006 | Oddsen et al. |
| 2014/0001331 A1 | 1/2014 | Oddsen, Jr. et al. |

OTHER PUBLICATIONS

Screenshots of 3D model of Innovative Office Products Model No. 405397 tilter device.

* cited by examiner

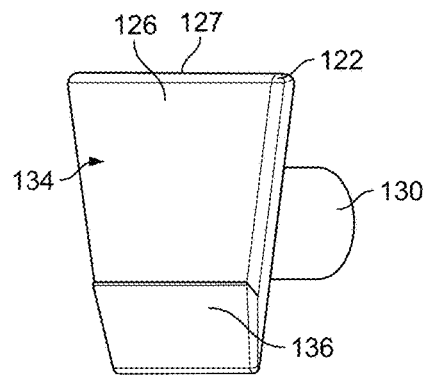
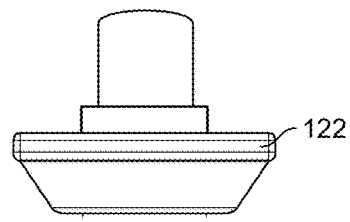
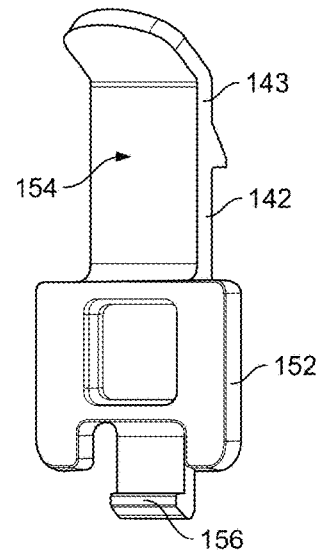
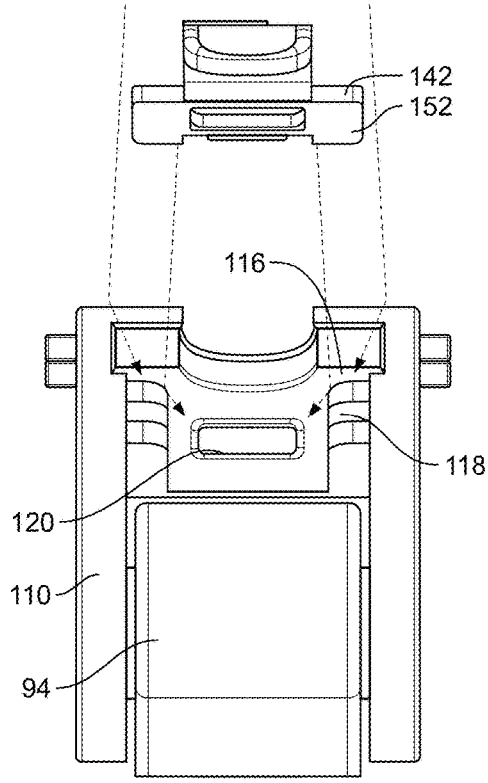
FIG. 7
FIG. 8

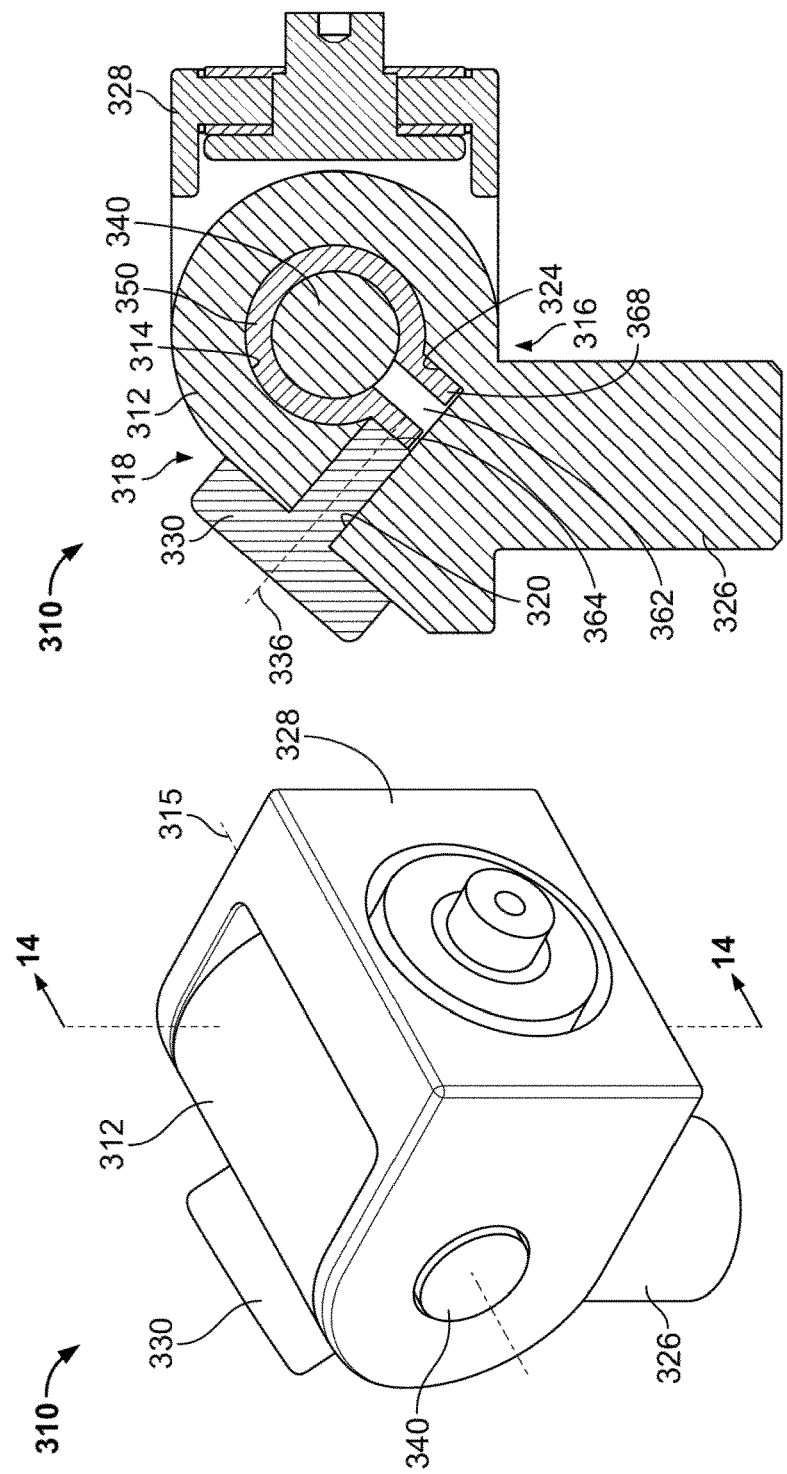

ARTICULATING SUPPORT ARM WITH IMPROVED TILTER AND FRICTION JOINT

FIELD OF THE INVENTION

The present invention relates to an articulating support arm for supporting an electronic device, such as a flat-screen monitor, having an improved tilter and friction joint.

BACKGROUND OF THE INVENTION

Some existing articulating arm and tilter designs use a set screw that is driven directly into a bushing of approximately circular cross-sectional area that is positioned around the rotating cylinder of an arm or tilter joint to supply pressure to the rotating cylinder in order to restrict rotation of the attached arm or user device about the rotating cylinder. In these prior art devices, the bushing includes a gap that permits the size of the outer circumference of the bushing to be adjusted when acted upon by the set screw, thus supplying the desired amount of friction to the rotating cylinder. In these devices, proper placement of the gap in the bushing away from the axis of the shaft of the set screw is necessary to ensure that the bushing properly transfers the force to the rotating cylinder that is being applied by the set screw to the bushing. If the gap in the bushing becomes aligned with—or gets too close to being aligned with—the axis of the shaft of the set screw, the gap in the bushing may not close and open as intended in response to movement of the set screw, thus causing the articulating arm joint or tilter to malfunction.

Further, in some prior art articulating arms and tilters, the bushing clamps around only a small portion of the width of the rotating cylinder, which causes clamping forces to be unevenly applied to the rotating cylinder and the set screws to work themselves loose over time.

Accordingly, there is a need for an articulating support arm with an improved friction joint that addresses these and other drawbacks of the prior art.

BRIEF DESCRIPTION OF THE DRAWINGS

The present invention will hereinafter be described in conjunction with the appended drawing figures, wherein like numerals denote like elements.

FIGS. 7 and 8 are partial exploded views of components thereof;

FIG. 13 is a perspective view of a tilter in accordance with an alternate embodiment of the present invention;

FIG. 14 is a sectional view taken along line 14-14 of FIG. 13;

DETAILED DESCRIPTION OF THE PREFERRED EMBODIMENTS

Figure 1:
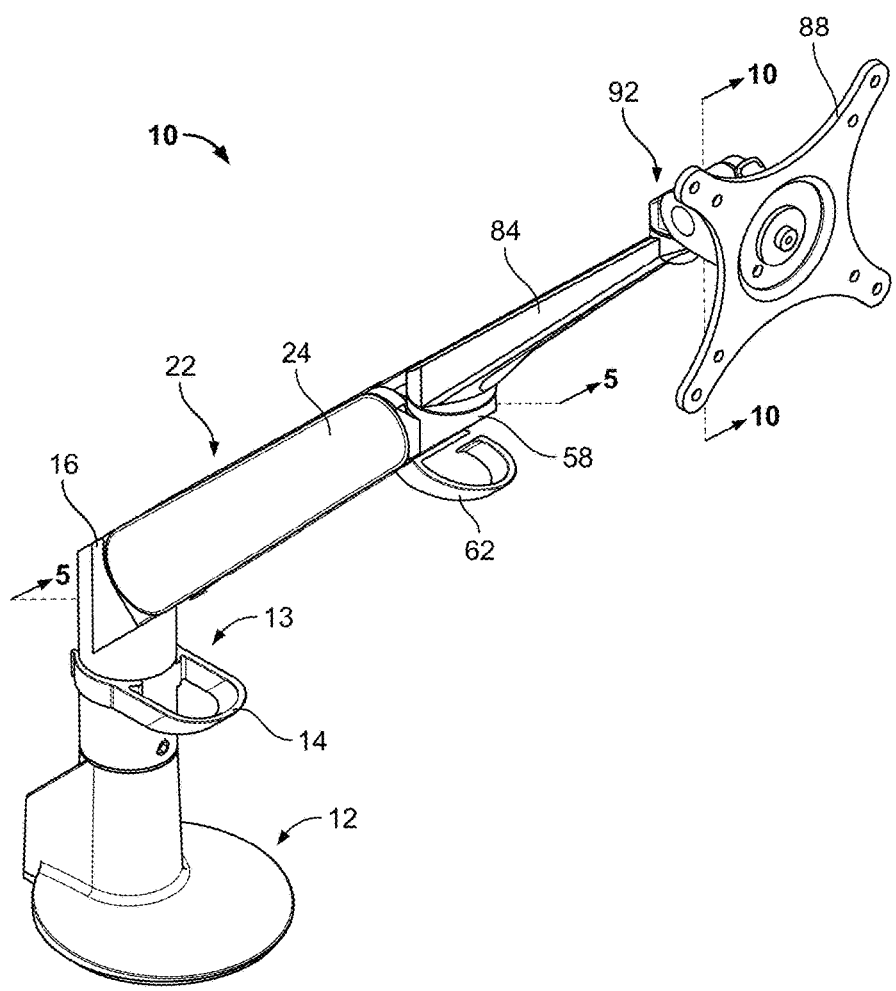
FIG. 1 is a perspective view of a support arm according to the present invention.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention, as set forth in the appended claims.

To aid in describing the invention, directional terms may be used in the specification and claims to describe portions of the present invention (e.g., upper, lower, left, right, etc.). These directional definitions are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

Various embodiments of an improved joint for use in an articulating arm including a bushing in accordance with the present inventive concept are taught in U.S. patent application Ser. No. 15/092,173, entitled "ARTICULATING SUPPORT ARM WITH IMPROVED TILTER AND FRICTION JOINT," which is incorporated herein by reference as if set forth in its entirety. This application has published as U.S. Patent Application Publication No. US2016/0305600A1.

Referring generally to FIGS. 1-10, an additional embodiment of a support arm 10 according to the present invention will be described in detail. As will be described in detail below, the support arm 10 is fully articulable in all three spatial axes to permit the desired placement and orientation of an attached electronic device (e.g., a display monitor). In this embodiment, the support arm 10 comprises a support mount 12 that is used to attach the support arm 10 to a desired surface. In this embodiment, the support mount 12 comprises a C-clamp (not shown) for attaching the support arm 10 around the edge of a desk, table top, or other support surface. In alternate embodiments, the support mount 12 could comprise a bolt-through mount, wall mount, ceiling mount, slat-wall mount, rail mount, or any other type of known mounting structure. Referring back to the embodiment of FIG. 1, the support arm 10 further comprises a base portion 13 having a cable router 14 attached thereto for collecting and routing cables that extend from the attached device. In this embodiment, the base portion 13 is rotatably coupled to the support mount 12 about a generally vertical axis (not labeled). In alternate embodiments according to the present invention, the base portion 13 could be rotationally fixed with respect to the support mount 12.

In the present embodiment, the support arm 10 further comprises a lower endcap 16, a lower arm portion 22 that is connected at a first end to the lower endcap 16 and at a second end to an upper endcap 58, a forearm 84 that is connected at a first end to the upper endcap 58 and at a second end to a tilter assembly 92, and a device mount 88 connected to the tilter assembly 92 that accommodates mounting an electronic device (e.g., a computer display monitor) thereto. As seen in FIG. 1, the lower endcap 16 is covered by a channel cover 24 for aesthetic purposes and to eliminate pinch points. In alternate embodiments, the channel cover 24 could be omitted. In the embodiment of FIG. 1, a second cable router 62 for collecting and routing cables that extend from the attached electronic device is attached to the upper endcap 58. In this embodiment, the bottom side of the forearm 84 is partially hollow to save on material costs. In alternate embodiments according to the present invention, cable clips or tabs could be included within the hollow space on the bottom side of the forearm 84 to permit device cable(s) to be at least partially retained and concealed within the forearm 84. In further alternate embodiments, the forearm 84 could be omitted entirely from the support arm 10, and the tilter assembly 92 and device mount 88 could be attached directly to the upper endcap 58.

FIGS. 2-5 generally show the construction of the lower arm portion 22 of the support arm 10. In this embodiment, the lower endcap 16 functions as the lower joint of a parallelogram structure comprising a lower channel 50 and a pair of stringers 56a,56b that collectively comprise an upper channel of the parallelogram structure, and the upper endcap 58 functions as the upper joint of the parallelogram structure. Said another way, the lower channel 50 is maintained in a parallel relationship to the pair of stringers 56a,56b in all positions and orientations of the lower arm portion 22 via the connections made by each of the stringers 56a,56b and the lower channel 50 with both of the lower endcap 16 and upper endcap 58. A first endcap pin 60a rotatably attaches the lower channel 50 to the upper endcap 58 and a second endcap pin 60b rotatably attaches the stringers 56a,56b to the upper endcap 58. In the present embodiment, each of the endcap pins 60a,60b is fixed in place by a respective retainer ring (not shown or labeled) that attaches to the end of the respective endcap pin 60a,60b and prevents the respective endcap pin 60a,60b from sliding out of the upper endcap 58. An axle pin 26 rotatably attaches the lower channel 50 to the lower endcap 16 about an axis of rotation 33 (see FIG. 4) and a spring axle pin 34 rotatably attaches the stringers 56a,56b to the lower endcap 16.

Figure 2:
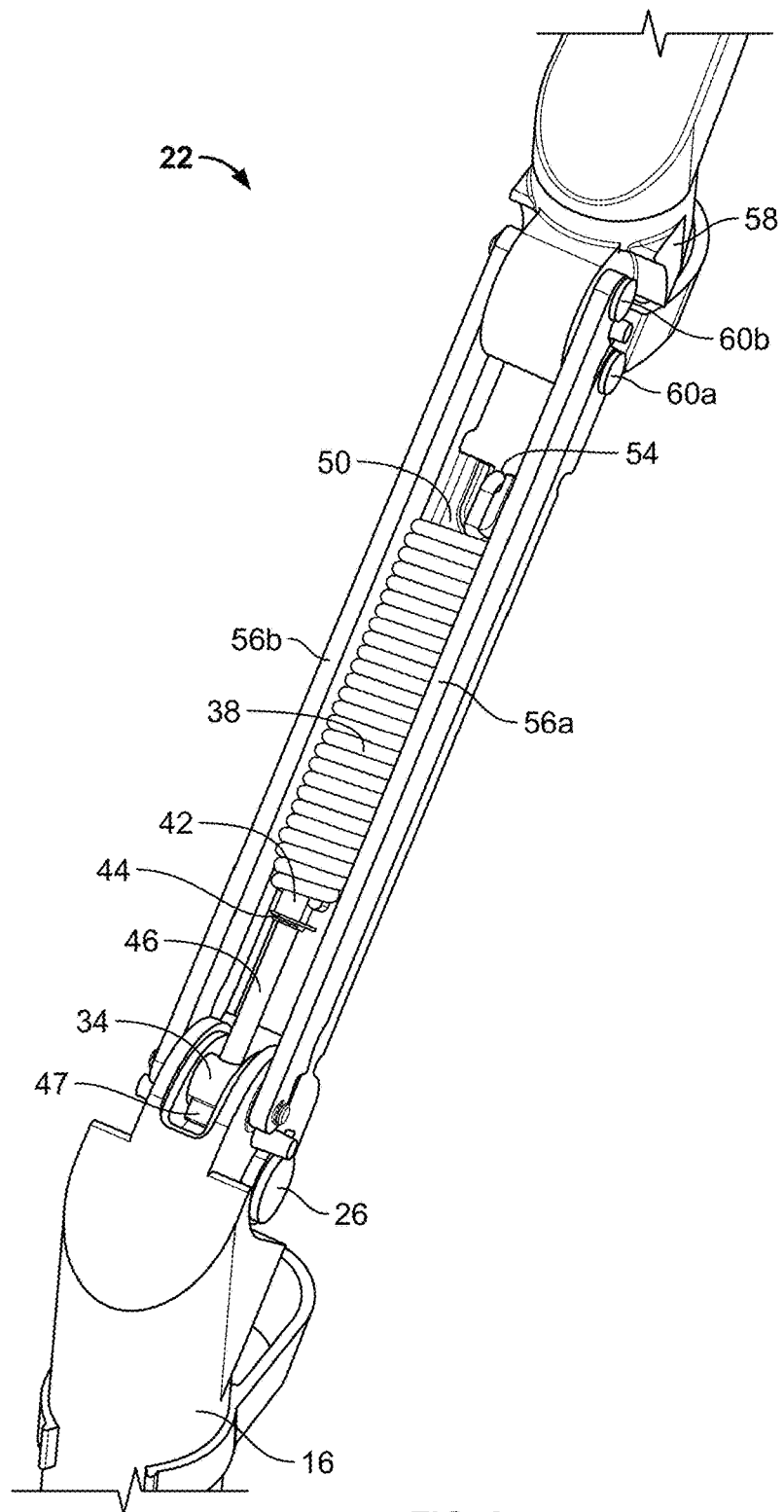
FIG. 2 is a perspective top view of the lower arm portion of the support arm of FIG. 1, with the lower arm portion channel cover removed.
Figure 5:
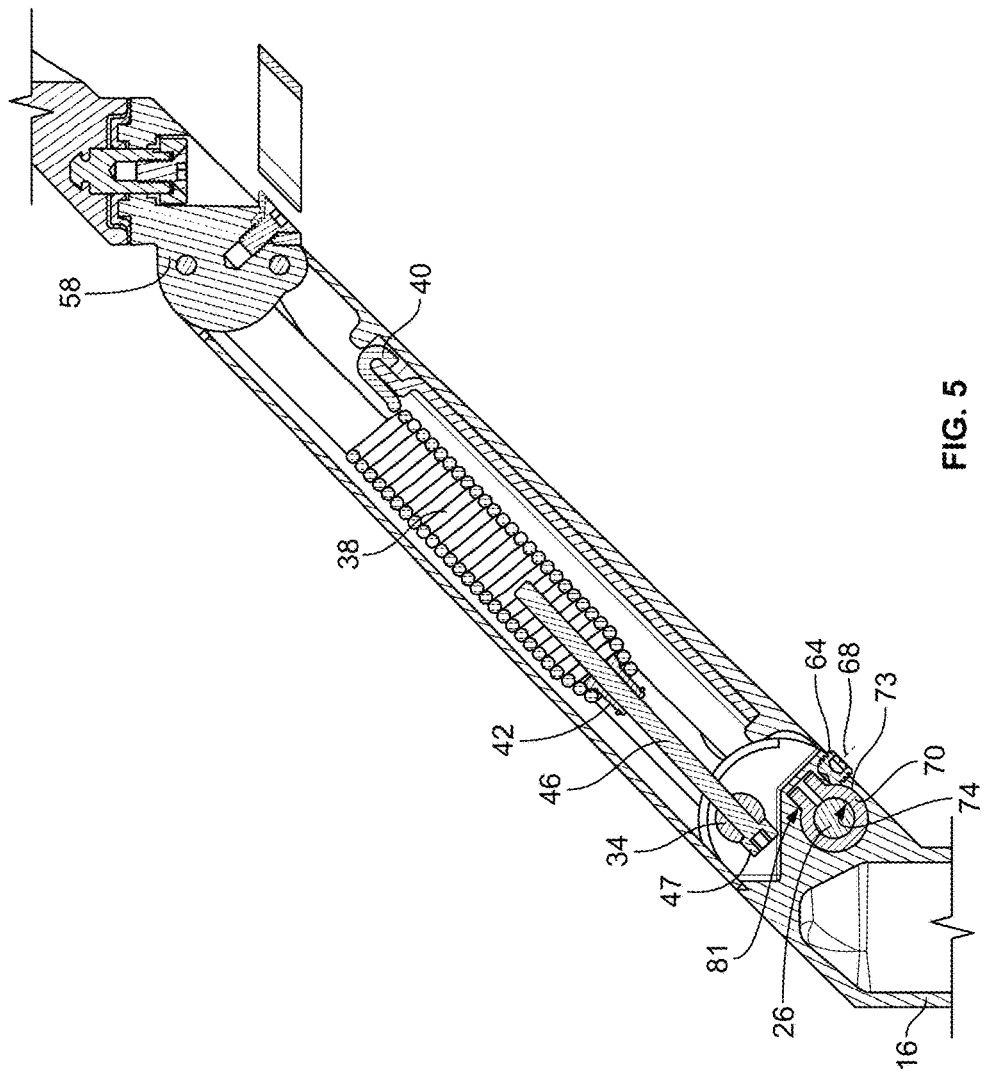
FIG. 5 is a sectional view taken along line 5-5 of FIG. 1.
Figure 6:
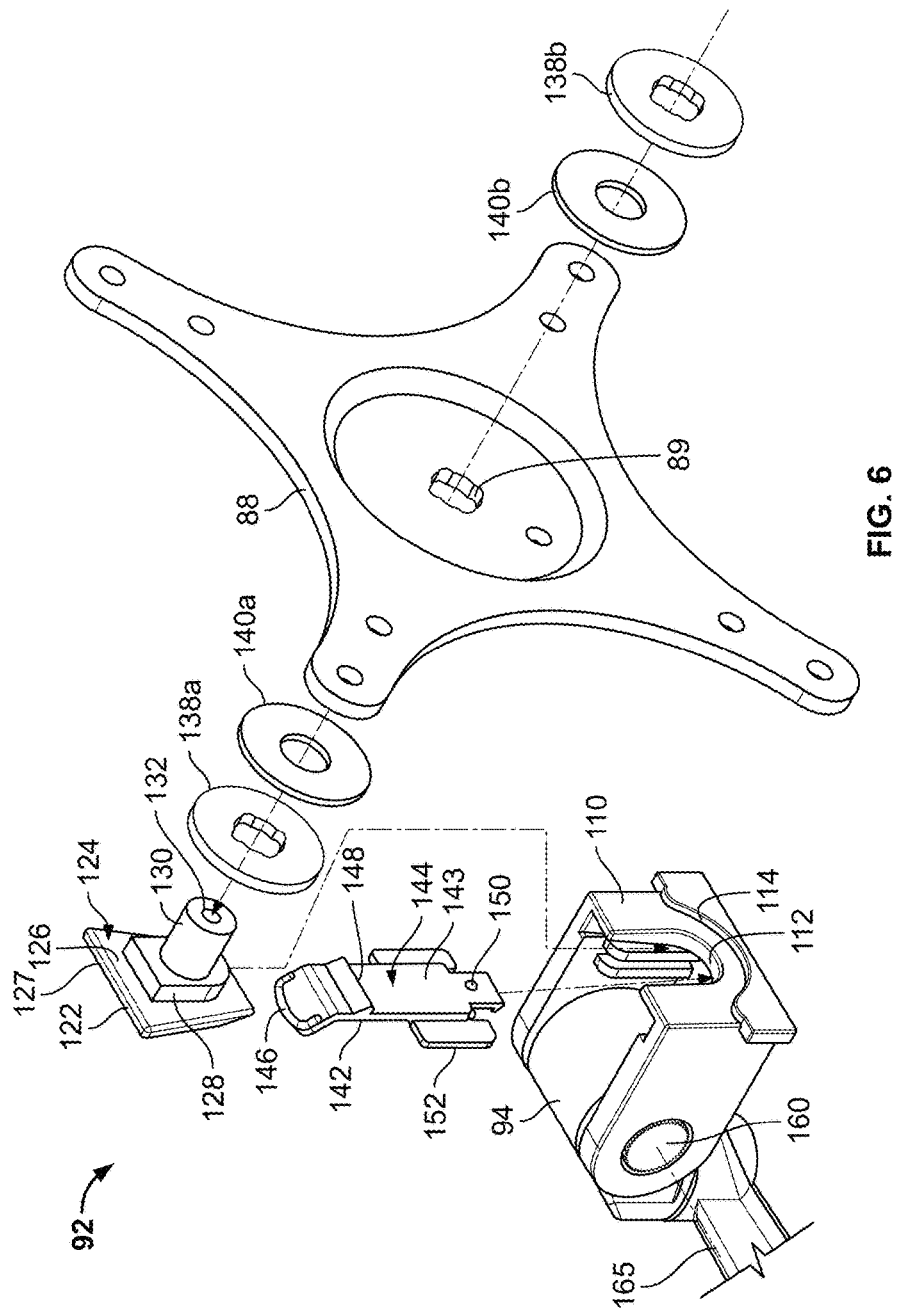
FIG. 6 is a partial exploded view of a tilter assembly of the support arm of FIG. 1.

As shown in FIGS. 2 and 5, the lower arm portion 22 further comprises a spring 38 that is attached between the lower endcap 16 and the lower channel 50 and nested above the lower channel 50 and between the stringers 56a,56b. In this embodiment, an upper end of the spring 38 has a hooked portion 40 that hooks around a hook slot 54 located in the lower channel 50 to fix the upper end of the spring 38 in relation to the lower channel 50. In this embodiment, the lower end of the spring 38 terminates within the length of the lower arm portion 22. A spring connection nut 42 is fixed to the lower end of the spring 38 and a spring connection bolt 46 is attached between the spring axle pin 34 and the spring connection nut 42. The spring connection nut 42 is internally threaded and engages with threading on the exterior of the spring connection bolt 46. A retaining ring 44 locks the spring connection bolt 46 to the spring connection nut 42. A pair of retaining rings (only retaining ring 36 labeled) fix the ends of the spring axle pin 34 to the stringers 56a,56b. In alternate embodiments according to the present invention, the spring 38 could be connected between the lower endcap 16 and the upper channel (via one or both stringers 56a,56b).

In this embodiment, the spring connection bolt 46 is used to supply a desired amount of tension to the spring 38 in order to permit the lower arm portion 22 to support a desired amount of mass that will be attached to the device mount 88 (e.g., the mass of a computer display monitor). In this embodiment, a bolt head 47 of the spring connection bolt 46 is rotated during construction of the lower arm portion 22 in order to move the spring connection nut 42 along the length of the spring connection bolt 46, thereby pre-tensioning the spring 38 to accommodate an attached device mass equal to the minimum end of the range of masses that the support arm 10 is designed to support. For example, if the support arm 10 is designed to support devices weighing between 6 and 20 pounds, the spring 38 is pre-tensioned during assembly to support (i.e., counteract) a mass of 6 pounds. As explained below in detail, the improved friction joint design according to the present invention is used to provide any necessary additional restorative force to the lower arm portion 22 to accommodate greater attached weights. In alternate embodiments according to the present invention, the bolt head 47 is accessible to the end user after the support arm 10 has shipped so that the end user can adjust the amount of restorative force that the spring 38 supplies to the lower arm portion 22.

Figure 3:
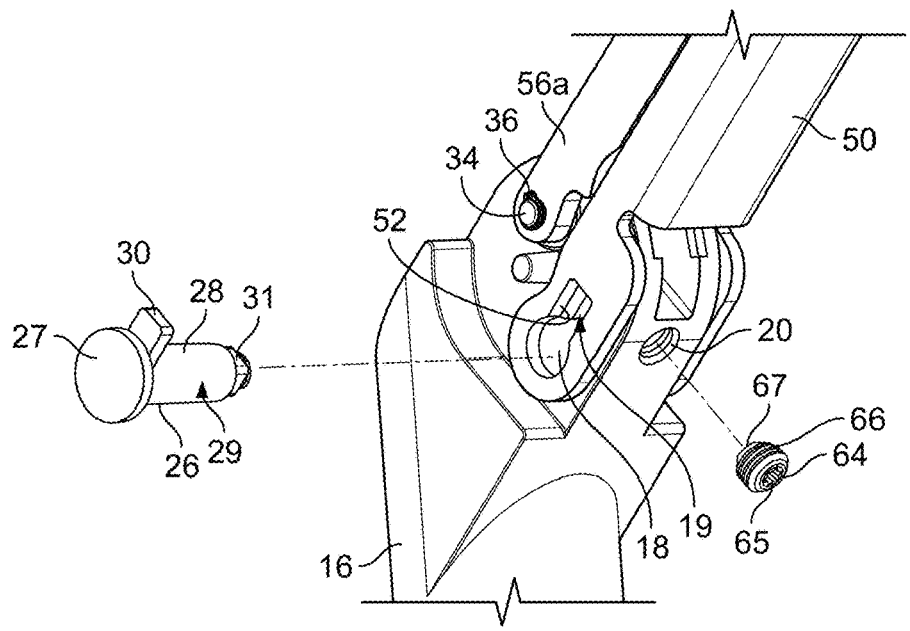
FIG. 3 is a partial exploded view of the lower endcap and lower arm portion of the support arm of FIG. 1.
Figure 4:
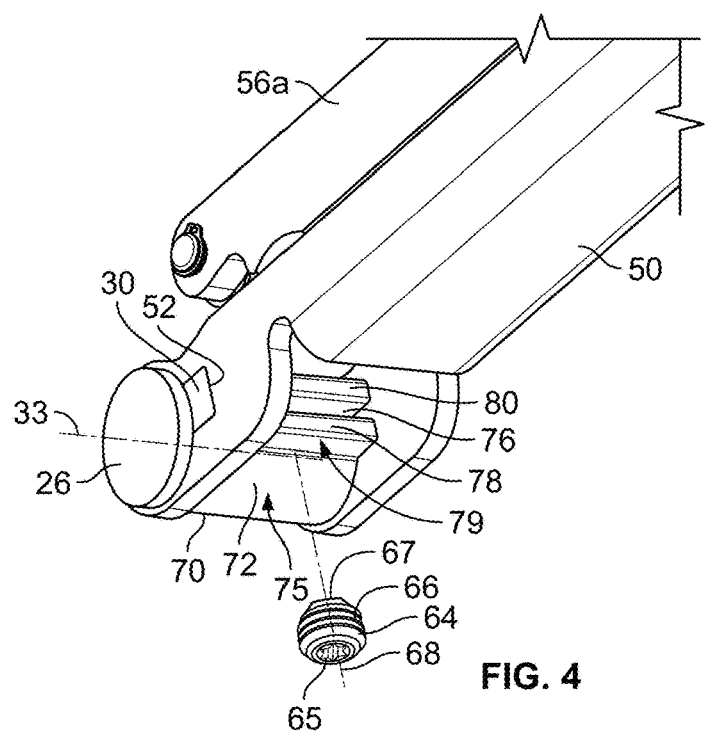
FIG. 4 is a partial exploded view of the lower arm portion of the support arm of FIG. 1.

As shown in the partial exploded view of FIG. 3, the axle pin 26 comprises a head 27, a first locking portion 30, a shaft 28 of cylindrical shape and having an exterior surface 29, and a second locking portion 31. It should be understood that the shaft 28 of the axle pin 26 acts as a friction cylinder that is engaged by a bushing 70, as will be described below in detail. The lower endcap 16 has an opening 18 through which the shaft 28 rotatably extends when the axle pin 26 is installed in the lower arm portion 22. The first locking portion 30 has a non-circular shape and a complementary-shaped locking portion cutout 52 is provided on a first side of the bottom end of the lower channel 50 so that the first locking portion 30 mates with the locking portion cutout 52 when the axle pin 26 is installed in the lower arm portion 22. The second locking portion 31, which is located on the opposite end of the shaft 28, also has a non-circular shape and mates with a non-circular cutout (not shown) located on the second side (not shown) of the bottom end of the lower channel 50 when the axle pin 26 is installed in the lower arm portion 22. In this way, the axle pin 26 is fixed to and rotates with the lower channel 50 about the axis of rotation 33 as the position of the lower arm portion 22 is changed. Simultaneously, the shaft 28 of the axle pin 26—due to its cylindrical shape—rotates within the opening 18 in the lower endcap 16.

As noted above, in this embodiment the lower endcap 16 comprises a friction joint in which the axle pin 26 serves as a friction cylinder, in other words a cylinder that is acted on by frictional forces in order to retard the movement of an object—in this case the lower channel 50—to which the axle pin 26 is attached. In this embodiment, the bottom side of the lower endcap 16 comprises a threaded passage 20. A threaded member 64, which in this embodiment is a set screw having a head 65, a threaded shaft 66, and an end face 67, is inserted into the threaded passage 20 and extended into or retracted from the threaded passage 20 to a desired degree by the end user of the support arm 10 in order to impart a desired amount of force to an exterior surface 75 of the bushing 70, as will be discussed below in greater detail. The threaded shaft 66 of the threaded member 64 is linear and has a central axis 68. In this embodiment, the threaded member 64 has a hex head opening that requires an Allen wrench or similar tool to adjust the tightness of the threaded member 64 against the bushing 70. In alternate embodiments, the threaded member 64 could be replaced with a manually-adjustable knob that does not require a tool to operate.

In the present embodiment, the bushing 70 is located within the opening 18 in the lower endcap 16 and the exterior surface 75 of the bushing 70 is in contact with the interior surfaces of the opening 18. The bushing 70 comprises a main portion 72 having an outer circumference 73 (see FIG. 5), a first tab 78 that extends partially exterior to the outer circumference 73 of the main portion 72, and a second tab 80 that extends partially exterior to the outer circumference 73 of the main portion 72. A gap 76 is located between the first tab 78 and the second tab 80, and extends partially exterior to the outer circumference 73. An outer surface 79 of the first tab 78 rests against a first seating surface (not labeled) of the opening 18 of the lower endcap 16, and an outer surface 81 of the second tab 80 rests against a second seating surface 19 of the opening 18 of the lower endcap 16. In this embodiment, the threaded passage 20 extends through the bottom surface of the lower endcap 16 and terminates on the first seating surface of the opening 18. In alternate embodiments according to the present invention, the threaded passage 20 could extend through the top surface of the lower endcap 16 and terminate on the second seating surface 19 of the opening 18. In this embodiment, the first tab 78 and second tab 80 of the bushing 70 are identical in shape and size. In alternate embodiments, the first tab 78 and second tab 80 could be of different shapes and/or sizes.

In this embodiment, when the threaded member 64 is extended further into the opening 18, an increased amount of force is imparted to the outer surface 79 of the first tab 78. Because the second tab 80 is in contact with the second seating surface 19 and the bushing 70 is otherwise captive within the opening 18, the gap 76 of the bushing 70 is maintained in its desired non-aligned orientation with respect to the central axis 68 of the threaded shaft 66 of the threaded member 64. This greatly reduces the likelihood that the bushing 70 will become misaligned over time as compared to known prior art devices. Furthermore, imparting force to or withdrawing force from the outer surface 79 of the first tab 78 will cause the outer circumference 73 of the bushing 70 to change in size. For example, when an increased amount of force is imparted to the outer surface 79 of the first tab 78 by rotating the threaded member 64 such that it extends further into the opening 18, the size of the gap 76 decreases, thus reducing the size of the outer circumference 73. The bushing 70 further comprises an interior surface 74 that engages the exterior surface 29 of the axle pin 26, which is routed interior to the bushing 70.

In alternate embodiments according to the present invention, the friction joint described above could be located instead within the upper endcap 58, with the spring 38 connected between the upper endcap 58 and either of the lower channel 50 or the upper channel (via one or both stringers 56a,56b), with the necessary changes to the arrangement of the support arm 10 being made, as would be appreciated by one having ordinary skill in the art.

As would be understood by one having ordinary skill in the art, it is desirable to design a support arm that is articulable and repositionable such that the attached device (e.g., a monitor) stays where it is placed, for example at different heights and rotational positions to accommodate different users of a workstation. Therefore, it is desirable that the restorative force applied by the support arm 10 to the device mount 88 at least approximates—and most desirably closely matches—the mass of the attached device, so that the attached device doesn't either "float up" or fall down after it has been placed in a desired position. As noted above, the spring 38 provides a baseline amount of restorative force to the lower arm portion 22, and thus to the entire support arm 10. Adjusting the position of the threaded member 64 with respect to the first tab 78 of the bushing 70 acts to increase or decrease the amount of frictional force that the interior surface 74 of the bushing 70 applies to the exterior surface 29 of the shaft 28 of the axle pin 26. Because the axle pin 26 is fixed to the lower channel 50 of the lower arm portion 22 via the first locking portion 30 and second locking portion 31, the addition of friction to the shaft 28 of the axle pin 26 permits the lower arm portion 22 (and accordingly the entire support arm 10) to support a greater attached mass from the device mount 88 in a stable (i.e., counterbalanced) position. Conversely, a reduction in the amount of force that is being applied to the shaft 28 of the axle pin 26 by the bushing 70 reduces the mass that will be supported (i.e., counterbalanced) by the lower arm portion 22. In practice, a user would likely make fine adjustments of the position of the threaded member 64 until the supporting force of the lower arm portion 22 (which is approximately equal to the restorative force supplied by the spring 38 to the lower channel 50 and the frictional force supplied to the lower channel 50 via the axle pin 26 being acted on by the bushing 70) approximately matches the gravitational forces that are pulling downwardly on the support arm 10 and any attached device.

In this embodiment, the central axis 68 of the threaded shaft 66 of the threaded member 64 that comes into contact with the first tab 78 of the bushing 70 does not intersect with any portion of the outer circumference 73 of the main portion 72 of the bushing 70. In other words, the location at which pressure is applied to the first tab 78 of the bushing 70 to grip the bushing 70 around the shaft 28 of the axle pin 26 is offset from the main portion 72 of the bushing 70. This geometry, coupled with the presence of the first seating surface and second seating surface 19—which act to hold the non-annular bushing 70 in a preferred rotational orientation with respect to the threaded member 64—allows for much finer, more accurate, and more reliable adjustment of the friction that is applied to the axle pin 26 by the bushing 70 as compared to known prior art devices. In alternate embodiments, the central axis 68 of the threaded shaft 66 of the threaded member 64 could intersect with or even bisect the main portion 72 of the bushing 70, so long as the end face 67 of the threaded member 64 engages the first tab 78 or second tab 80 at an angle sufficient to adequately alter the size of the gap 76 in the bushing 70 to properly vary the amount of friction being applied to the shaft 28 of the axle pin 26. Turning back to the present embodiment, the central axis 68 is oriented at an orthogonal angle to the gap 76 in the bushing 70 when the threaded shaft 66 is extended through the threaded passage 20. In alternate embodiments, the central axis 68 could be arranged at a non-orthogonal angle with respect to the gap 76 when the threaded shaft 66 is extended through the threaded passage 20. For example, the central axis 68 could be arranged with respect to the gap 76 at an angle between 0-90 degrees, more preferably at an angle between 15-90 degrees, and most preferably at an angle between 30-90 degrees.

As shown in FIG. 5, forearm 84 is attached to upper endcap 58 such that the forearm 84 may rotate about a vertical axis with respect to the upper endcap 58. In this embodiment, the forearm 84 is attached to the upper endcap 58 via a structure that is identical to the structure that is employed to connect the forearm 84 to the tilter assembly 92. This structure will be discussed in greater detail below with respect to FIG. 10, it being understood that this discussion is equally applicable to the connection between the forearm 84 and the upper endcap 58.

Referring now to FIGS. 6-10, a first embodiment of a tilter assembly 92 according to the present invention will be described in detail. In this embodiment, the tilter assembly 92 comprises the device mount 88, which in this embodiment comprises two sets of four display screen mounting holes (not labeled) that are arranged according to existing industry standards for video displays, for example the Video Electronics Standards Association (VESA). In this embodiment, the two sets of display screen mounting holes are arranged, respectively, in 75 mm×75 mm and 100 mm×100 mm square hole patterns according to VESA standards. It should be understood that, in alternate embodiments, the display screen mounting holes may be arranged in non-standard pattern(s), only one set of display screen mounting holes may be included on the device mount 88, or more than two sets of display screen mounting holes may be included on the device mount 88. As would be appreciated by one having ordinary skill in the relevant art, an electronic device (e.g., a monitor) is mountable to the device mount 88 by aligning the appropriate set of display screen mounting holes with the appropriate mounting holes on the back of the electronic device, and securing appropriate fasteners (e.g., machine screws) through both sets of holes.

In this embodiment, the tilter assembly 92 further comprises a tilter body 94 that is rotatably attached to a coupling 86 of the forearm 84 about a generally vertical axis (not labeled) and a center tilt mount 110 that is rotatably attached to the tilter body 94 via a friction cylinder 160 about an axis of rotation 165. The tilter assembly 92 further comprises a rivet plate 122 and a rivet plate holder 142. The rivet plate 122 comprises a main body 126 having a top edge 127, a front side 124 that includes a front mount portion 128 and a mounting shaft 130 having a rivet hole 132 centrally located therein, and a rear side 134 that includes a sloped surface 136 at its lower end. In this embodiment, the device mount 88 is mounted to the rivet plate 122 by routing a rivet (not shown) sequentially through washer 138b, washer 140b, a central mounting hole 89 of the device mount 88, washer 140a, washer 138a, and into the rivet hole 132 of the rivet plate 122. In this embodiment, the washers 138a,138b are comprised of steel for rigidity and the washers 140a,140b are comprised of nylon so that there is no metal-on-metal contact after the device mount 88 is mounted into the rivet hole 132 of the mounting shaft 130. It should be understood that, in alternate embodiments, suitable alternate materials for the washers 138a,138b,140a,140b are possible within the scope of this invention. In this embodiment, the device mount 88 is rotatable in 360 degrees with respect to the mounting shaft 130 once attached thereto. In alternate embodiments, the device mount 88 may be rotationally fixed with respect to the mounting shaft 130 or rotatable only through a particular range of motion through the use of one or more stop members (e.g., rotatable by a maximum of approximately 90 degrees to permit an attached electronic display to be reoriented only between portrait and landscape orientations).

The rivet plate holder 142 comprises a main portion 143 and a mounting portion 152. A front side 144 of the main portion 143 comprises a release tab 146, a catch 148 having a sloped surface 149, and a stud 150. A rear side 154 of the main portion 143 comprises a mounting hook 156 located at a bottom end thereof. The center tilt mount 110 comprises a front mount cutout 112 that permits the mounting shaft 130 of the rivet plate 122 to extend from the center tilt mount 110 once the rivet plate 122 is installed within the center tilt mount 110, and an arcuate portion 114 that accommodates the plate-shaped rear indentation (see FIG. 6) of the device mount 88.

As seen in FIG. 8, the center tilt mount 110 comprises a rivet plate holder slot 118 for releasably supporting the rivet plate holder 142 therein and a rivet plate slot 116 for releasably supporting the rivet plate 122 therein. When the rivet plate holder 142 is installed within the rivet plate holder slot 118 of the center tilt mount 110, the mounting portion 152 of the rivet plate holder 142 engages the slotted side portions of the rivet plate holder slot 118 and the mounting hook 156 located on the bottom end of the rivet plate holder 142 engages a mounting hook slot 120 that is formed through a bottom surface 96 of the center tilt mount 110. In this way, the rivet plate holder 142 is securely but releasably installed within the center tilt mount 110. If necessary, the rivet plate holder 142 may be released from the center tilt mount 110 by pressing forwardly on the mounting hook 156 while pulling upwardly on the rivet plate holder 142, thereby freeing the mounting hook 156 from the mounting hook slot 120 and permitting the rivet plate holder 142 to be pulled upwardly out of the rivet plate holder slot 118 and removed from the center tilt mount 110.

In this embodiment, the rivet plate 122 is releasably attachable to the rivet plate holder 142. Specifically, when the rivet plate 122 is moved downwardly towards the rivet plate holder 142 to install the rivet plate 122—as partially shown in FIG. 7—the sloped surface 136 of the rear side 134 of the main body 126 of the rivet plate 122 rides along the catch 148 and temporarily deforms the main portion 143 of the rivet plate holder 142 rearwardly until the top edge 127 of the main body 126 of the rivet plate 122 clears the sloped surface 149 of the catch 148. Once the top edge 127 of the main body 126 of the rivet plate 122 clears the sloped surface 149 of the catch 148 of the rivet plate holder 142, the main portion 143 of the rivet plate holder 142 will inherently spring back forwardly so that the catch 148 becomes located above the top edge 127 of the main body 126 of the rivet plate 122 as the rivet plate 122 slides into the rivet plate slot 116. The rivet plate 122 is thus securely but releasably installed within the tilter assembly 92. To release the rivet plate 122 (and any attached device) from the tilter assembly 92, a user would deform the main portion 143 of the rivet plate holder 142 by pressing rearwardly on the release tab 146 until the catch 148 is no longer located above the top edge 127 of the main body 126 of the rivet plate 122 while simultaneously lifting upwardly on the rivet plate 122 (and any attached device) until the top edge 127 of the rivet plate 122 is clear of the catch 148. The tilter assembly 92 according to the present invention thus provides an improved quick-release mechanism over prior art devices. In this embodiment, the main body 126 of the rivet plate 122 has a generally keystone-shaped profile that greatly reduces the risk that a user will install the rivet plate 122 incorrectly into the center tilt mount 110. Not only does the irregular shape of the main body 126 of the rivet plate 122 visually indicate to the user the appropriate orientation of the rivet plate 122, but the rivet plate 122 will in general attach easily to the tilter assembly 92 only when the sloped surface 136 is aimed downwardly during installation.

Figure 9:
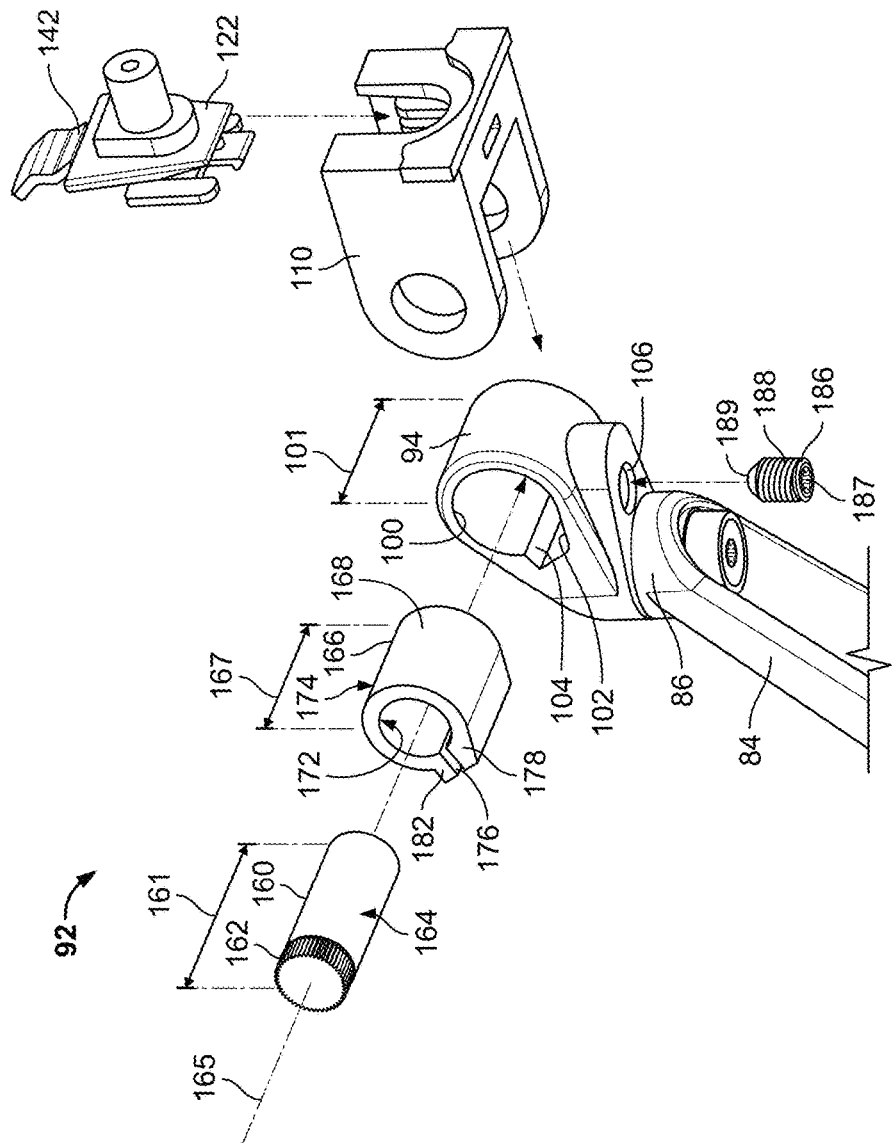
FIG. 9 is a partial exploded view of the tilter assembly of FIG. 6.
Figure 10:
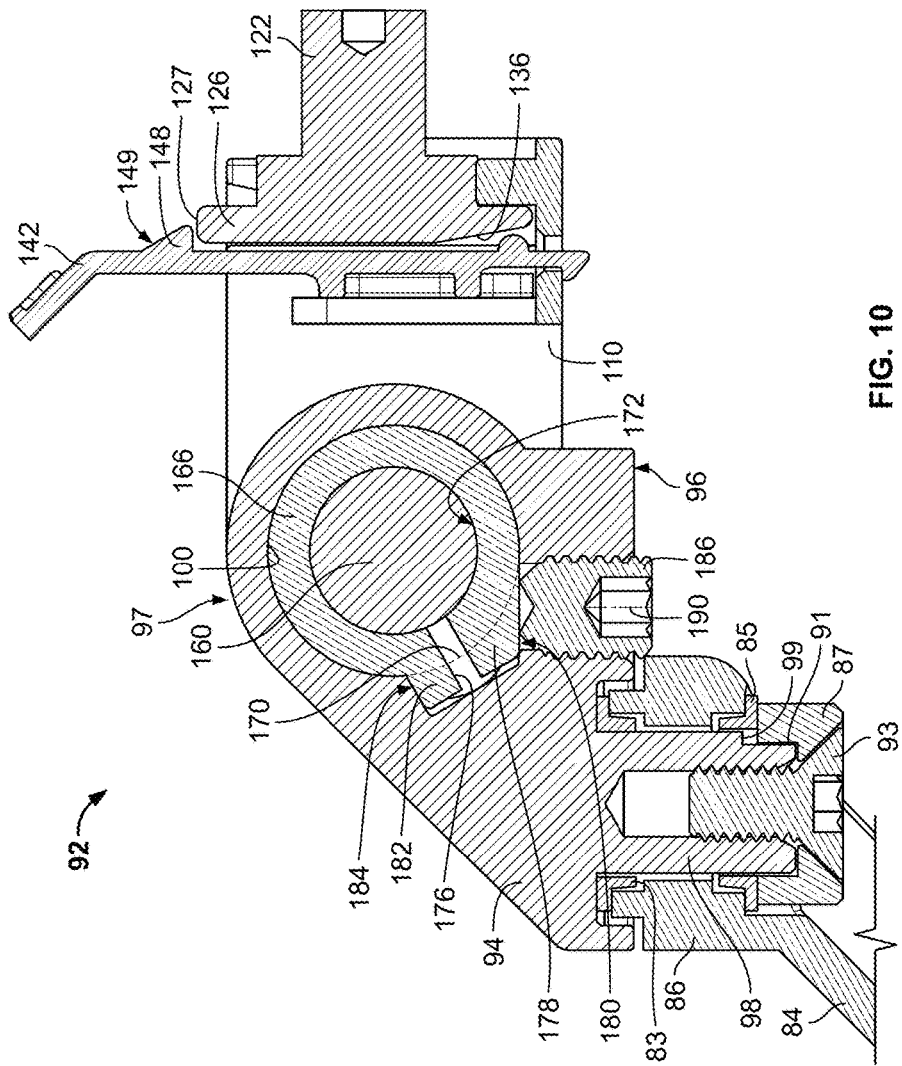
FIG. 10 is a sectional view taken along line 10-10 of FIG. 1.

FIGS. 9 and 10 show additional details of the tilter assembly 92. In this embodiment, the tilter assembly 92 has a tilter body 94 having an opening 100 therethrough, a bottom surface 96, a top surface 97, a threaded passage 106 extending through the bottom surface 96 and into the opening 100, and a tilter shaft 98 extending from the bottom surface 96 which is used to attach the tilter assembly 92 to the coupling 86 of the forearm 84 and rotate the tilter assembly 92 about a generally vertical axis (not labeled). A bearing bushing 83 of generally circular shape is located between the tilter body 94 and the coupling 86 of the forearm 84 to prevent metal-on-metal contact between the tilter body 94 and coupling 86. As noted above, the connection between the forearm 84 and the tilter assembly 92 comprises an anti-loosening apparatus that prevents the tilter assembly 92 from coming loose from the coupling 86 of the forearm 84 as the tilter shaft 98 is rotated with respect to the coupling 86. In this embodiment, the bottom end of the tilter shaft 98 is circular except for a cutout portion 99. A bearing washer 85 of generally circular shape is located between the coupling 86 of the forearm 84 and a shaft cap 87. In this embodiment the bearing washer 85 is comprised of steel, but in alternate embodiments according to the present invention suitable additional materials are possible, for example nylon or acetal resin. The shaft cap 87 is generally annular in shape, but also has a protruding portion 91 that protrudes inwardly from the interior surface and mates with the cutout portion 99 of the bottom end of the tilter shaft 98. A fastener 93 is routed through the shaft cap 87 and rotated into threading located in the bottom end of the tilter shaft 98 to secure the joint together. Due to the interaction between the protruding portion 91 of the shaft cap 87 and the cutout portion 99 of the bottom end of the tilter shaft 98, the tilter shaft 98 and shaft cap 87 are rotationally fixed together below the coupling 86, thus preventing this joint from coming loose over time. In alternate embodiments according to the present invention, the bottom end of the tilter shaft 98 contains a plurality of cutout portions or indents and the shaft cap 87 comprises a complementary plurality of protrusions that mate with the cutout portions in the tilter shaft 98 such that the tilter shaft 98 and shaft cap 87 are rotationally fixed together.

A threaded member 186, which in this embodiment is a set screw having a head 187, a threaded shaft 188, and an end face 189, is inserted into the threaded passage 106 and extended into or retracted from the opening 100 to a desired degree in order to impart a desired amount of force to an exterior surface 174 of a bushing 166, as will be discussed below in further detail. The threaded shaft 188 of the threaded member 186 has a central axis 190. In this embodiment, the threaded member 186 will typically be rotated using a tool (e.g., an Allen wrench) to adjust the tightness of the threaded member 186 against the bushing 166. In alternate embodiments, the set screw could be replaced with a bolt or other fastener that requires a tool to operate or a manually-adjustable knob.

The opening 100 in the tilter body 94 has a width 101 and contains a first seating surface 102 and a second seating surface 104. The bushing 166 is located within the opening 100 and the exterior surface 174 of the bushing 166 is in contact with the interior surfaces of the opening 100. The bushing 166 comprises a main portion 168 having a width 167 and an outer circumference 170, a first tab 178 that extends partially exterior to the outer circumference 170 of the main portion 168, and a second tab 182 that extends partially exterior to the outer circumference 170 of the main portion 168. A gap 176 is located between the first tab 178 and the second tab 182, and the gap 176 extends partially exterior to the outer circumference 170. An outer surface 180 of the first tab 178 rests against the first seating surface 102 and an outer surface 184 of the second tab 182 rests against the second seating surface 104. In this embodiment, the threaded passage 106 extends through the bottom surface 96 of the tilter body 94 and terminates on the first seating surface 102. In alternate embodiments according to the present invention, the threaded passage 106 could extend through the top surface of the tilter body 94 and terminate on the second seating surface 104. In the present embodiment, the first tab 178 and second tab 182 are of different shapes. In alternate embodiments, the first tab 178 and second tab 182 could be of the same shape and/or size.

In the present embodiment, when the threaded member 186 is extended further into the opening 100, an increased amount of force is imparted to the outer surface 180 of the first tab 178. Because the second tab 182 is in contact with the second seating surface 104 and the bushing 166 is otherwise captive within the opening 100, the gap 176 of the bushing 166 is maintained in its desired non-aligned orientation with respect to the central axis 190 of the threaded shaft 188 of the threaded member 186. This greatly reduces the likelihood that the bushing 166 will become misaligned over time as compared to known prior art tilters. In this way, imparting force to or withdrawing force from the outer surface 180 of the first tab 178 will cause the outer circumference 170 to change in size. For example, when an increased amount of force is imparted to the outer surface 180 of the first tab 178 by rotating the threaded member 186 such that it extends further into the opening 100, the size of the gap 176 decreases, thus reducing the size of the outer circumference 170. The bushing 166 further comprises an interior surface 172 that engages an exterior surface 164 of a friction cylinder 160 that is routed interior to the bushing 166.

In this embodiment, the friction cylinder 160 has a width 161 and a knurled end portion 162 that fixedly engages the center tilt mount 110 such that the friction cylinder 160 and center tilt mount 110 rotate simultaneously about the axis of rotation 165. As noted above, a user device having a particular mass is attached to the device mount 88—which is fixedly attached to the center tilt mount 110—and the threaded member 186 is tightened against the outer surface 180 of the first tab 178 until sufficient force is applied to the friction cylinder 160 by the bushing 166 to adequately support the mass of the user device.

In this embodiment, the central axis 190 of the threaded shaft 188 of the threaded member 186 that comes into contact with the first tab 178 of the bushing 166 intersects the outer circumference 170 of the main portion 168 of the bushing 166 and the end face 189 of the threaded member 186 engages the first tab 178 at an angle sufficient to adequately alter the size of the gap 176 in the bushing 166 to properly vary the amount of friction being applied to the friction cylinder 160. In alternate embodiments, the central axis 190 could intersect the outer circumference 170 at any possible angle, including bisecting the outer circumference 170, or could not intersect with the outer circumference 170 at all, so long as the end face 189 of the threaded member 186 engages the first tab 178 at an angle sufficient to adequately alter the size of the gap 176 in the bushing 166 to properly vary the amount of friction being applied to the friction cylinder 160. In the present embodiment, the central axis 190 is oriented at a non-orthogonal angle of approximately 40 degrees to the gap 176 in the bushing 166 when the threaded shaft 188 is extended through the threaded passage 106. In alternate embodiments, the central axis 190 could be arranged at an orthogonal angle or other non-orthogonal angles with respect to the gap 176 when the threaded shaft 188 is extended through the threaded passage 106. For example, the central axis 190 could be arranged with respect to the gap 176 at any angle between 0-90 degrees, more preferably at an angle between 15-90 degrees, and most preferably at an angle between 30-90 degrees.

Figure 11:
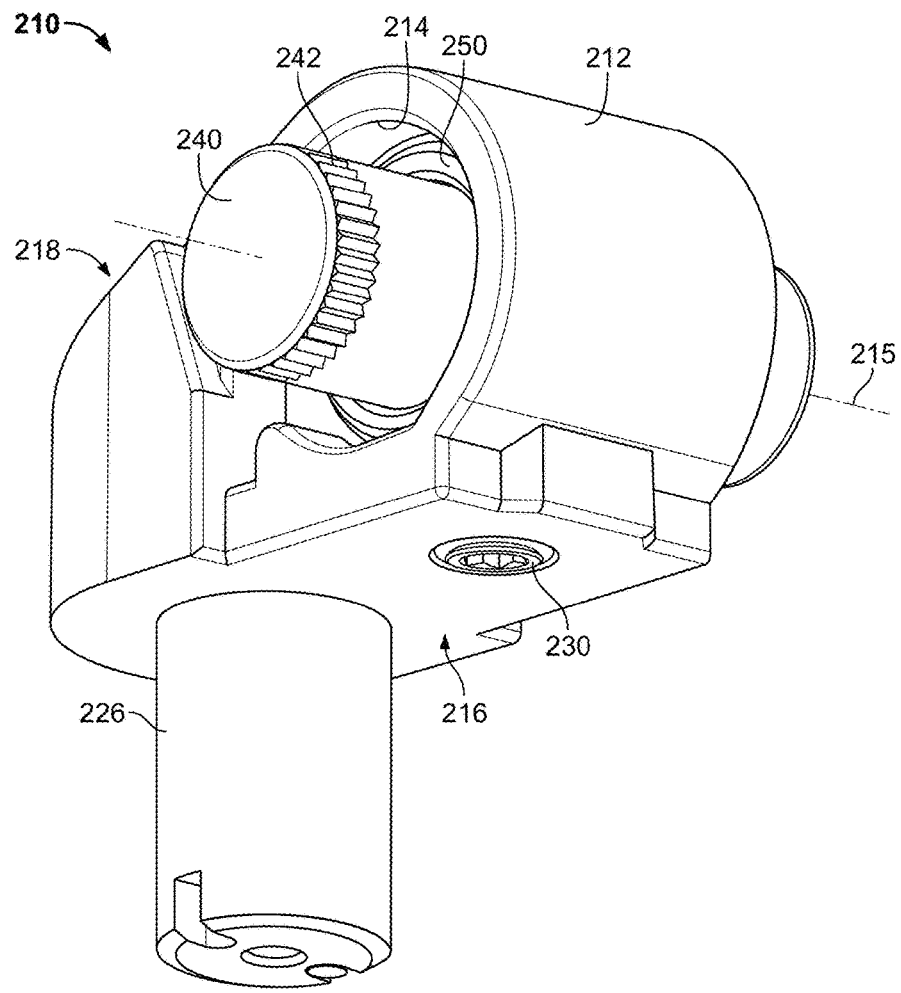
FIG. 11 is a perspective view of a tilter in accordance with the prior art.
Figure 12:
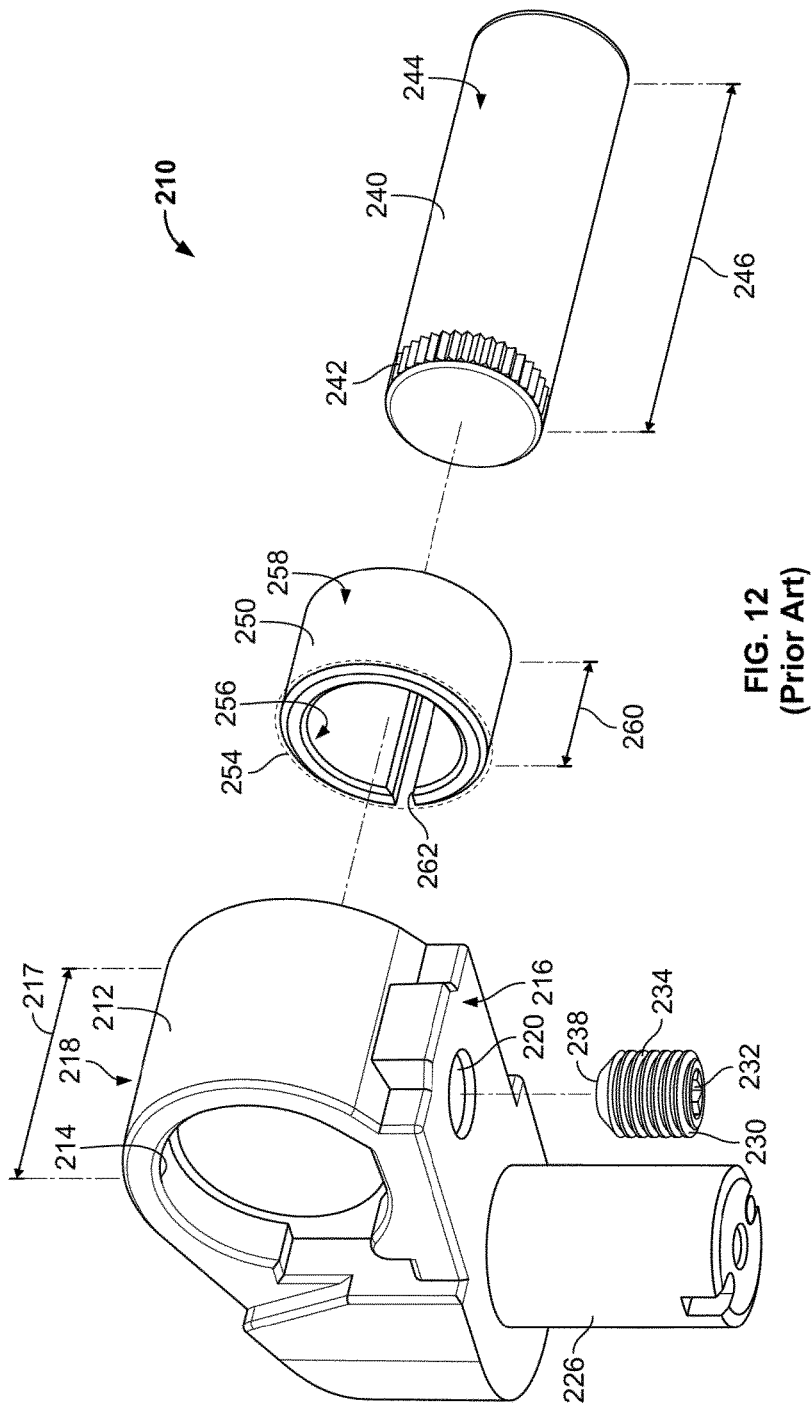
FIG. 12 is an exploded view thereof.

In this embodiment, the bushing 166 has a width 167 that is much larger in comparison to both the width 101 of the opening 100 in the tilter body 94 and the width 161 of the friction cylinder 160 than the respective width ratios in the tilter assembly 210 according to the prior art that is shown in FIGS. 11 and 12 and discussed below. For example, in this embodiment the width 167 of the bushing 166 is greater than 50% of the width 161 of the friction cylinder 160 and equal to the width 101 of the opening 100 in the tilter body 94. In alternate embodiments, the width 167 of the bushing 166 may be between 50-90% of the width 161 of the friction cylinder 160 and/or the width 167 of the bushing 166 may be between 75-100% of the width 101 of the opening 100 in the tilter body 94. In further alternate embodiments, the width 167 of the bushing 166 may be approximately two-thirds of the width 161 of the friction cylinder 160 and/or the width 167 of the bushing 166 may be approximately equal to the width 101 of the opening 100 in the tilter body 94.

For sake of comparison, FIGS. 11 and 12 show a tilter assembly 210 in accordance with the prior art. For ease of discussion certain primary components of the tilter assembly 210 are omitted from these figures, for example the center tilt mount that attaches to the ends of the friction cylinder 240 and that is used to support a user device, for example a flat-screen monitor. As shown in FIGS. 11 and 12, the tilter assembly 210 comprises a tilter body 212 having an opening 214 therethrough, the opening 214 having a width 217. The tilter body 212 further comprises a bottom surface 216, a top surface 218, a passage 220 extending through the bottom surface 216 and into the opening 214, and a tilter shaft 226 extending from the bottom surface 216 which is used to attach the tilter assembly 210 to a support means and rotate the tilter assembly 210 about a generally vertical axis (not labeled). The passage 220 is internally threaded.

A threaded member 230, which in this embodiment is a set screw having a head 232, a threaded shaft 234, and an end face 238, is inserted into the passage 220 and extended into or retracted from the opening 214 to a desired degree in order to impart a desired amount of force to an exterior surface 258 of a bushing 250, as will be discussed below in greater detail.

The bushing 250 is located within the opening 214 and the exterior surface 258 of the bushing 250 is in contact with the interior surfaces of the opening 214. The bushing 250 comprises a gap 262 along its circumference. The bushing 250 has an outer circumference 254 that changes in size when the amount of force imparted to the exterior surface 258 thereof by the threaded member 230 is adjusted. For example, when an increased amount of force is imparted to the exterior surface 258 of the bushing 250 by rotating the threaded member 230 such that it extends further into the opening 214, the size of the gap 262 decreases so that the outer circumference 254 decreases in size, because the bushing 250 is captive within the opening 214 such that the bushing 250 cannot otherwise move. The bushing 250 further comprises an interior surface 256 that engages an exterior surface 244 of a friction cylinder 240 that is routed interior to the bushing 250 along an axis of rotation 215. The bushing 250 has a width 260 and the friction cylinder has a width 246.

In this prior art tilter assembly 210, the friction cylinder 240 comprises a knurled end portion 242 that fixedly engages a center tilt mount component (not shown) such that the friction cylinder 240 and center tilt mount rotate simultaneously about the axis of rotation 215. As noted above, a user device having a particular mass is attached to the center tilt mount via one or more intermediate components that would be understood by one having ordinary skill in the art (e.g., a rotating plate, a VESA plate, and/or a quick-release adapter). In order to handle a device having a large mass, the threaded member 230 is pressed more tightly into the exterior surface 258 of the bushing 250, thereby imparting a greater frictional force to the exterior surface 244 of the friction cylinder 240 until the mass of the user device is appropriately supported. An item of lesser mass would not require the threaded member 230 to be pressed as tightly into the bushing 250.

In this prior art tilter assembly 210, the width 260 of the bushing 250 is approximately 50% of the width 217 of the opening 214 in the tilter body 212, and the width 260 of the bushing 250 is approximately 25-30% of the width 246 of the friction cylinder 240. Accordingly, when pressure is applied to the exterior surface 258 of the bushing 250, the interior surface 256 of the bushing 250 applies force to less than one-third of the width 246 of the friction cylinder 240. This can cause the forces to be applied unevenly to the friction cylinder 240, and result in the threaded member 230 working itself loose over time as the user device is moved (i.e., cycled) up and down about the axis of rotation 215. Moreover, in the prior art tilter assembly 210 the bushing 250 is made of bronze, which is expensive and causes the tilter assembly 210 to create creaking noises when metal-on-metal contact between the threaded member 230 and the bushing 250 occurs.

Further, in the prior art tilter assembly 210, if the bushing 250 is installed improperly such that the end face 238 of the threaded member 230 engages the gap 262 in the bushing 250 or the gap 262 is not properly rotated with respect to the threaded member 230 such that the force imparted by the threaded member 230 will act to change the size of the gap 262 (for example if the gap 262 is rotated exactly opposite the location where the end face 238 engages the bushing 250), the tilter assembly 210 will malfunction. Because the bushing 250 is annular, furthermore, there is nothing to prevent the bushing 250 from rotating out of its desired orientation with respect to the threaded member 230 over time if the frictional forces being applied to the bushing 250 become insufficient to prevent its rotation.

Figure 15:
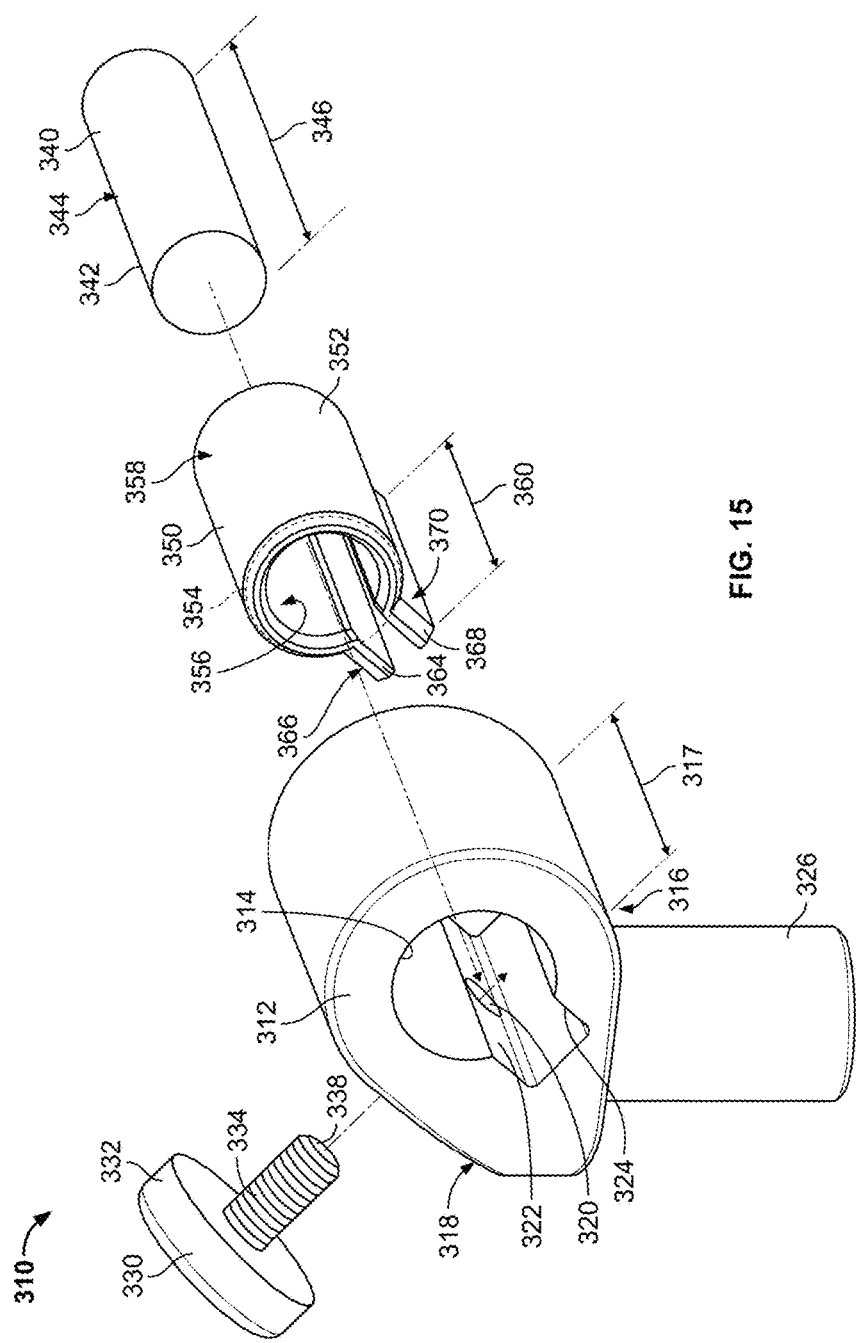
FIG. 15 is an exploded view of the tilter of FIG. 13.

Referring now to FIGS. 13-15, an alternate embodiment of a tilter assembly 310 according to the present invention will be described in detail. In this embodiment, the tilter assembly 310 has a tilter body 312 having an opening 314 therethrough, a bottom surface 316, a top surface 318, a passage 320 extending through the top surface 318 and into the opening 314, and a tilter shaft 326 extending from the bottom surface 316 which is used to attach the tilter assembly 310 to a support means and rotate the tilter assembly 310 about a generally vertical axis. In this embodiment, the passage 320 has internal threading. The opening 314 has a width 317 (see FIG. 15) and contains a first seating surface 322 and a second seating surface 324. In this embodiment, a center tilt mount 328 of the tilter assembly 310 is shown in FIGS. 13 and 14, but is omitted from FIG. 15 for ease of discussion. The center tilt mount 328 attaches to the tilter assembly 310 and functions in the same manner as in the tilter assembly 92 of FIGS. 6-10.

A threaded member 330, which in this embodiment is an adjustment knob having a head 332, a threaded shaft 334, and an end face 338, is inserted into the passage 320 and extended into or retracted from the opening 314 to a desired degree in order to impart a desired amount of force to an exterior surface 358 of a bushing 350, as will be discussed below in greater detail. The threaded shaft 334 of the threaded member 330 is linear and has a central axis 336. In this embodiment, the threaded member 330 may be operated by hand using the head 332 without the need for a tool (e.g., an Allen wrench) to adjust the tightness of the threaded member 330 against the bushing 350. In alternate embodiments, the adjustment knob could be replaced with a set screw, bolt, or other fastener that requires a tool to operate.

The bushing 350 is located within the opening 314 and the exterior surface 358 of the bushing 350 is in contact with the interior surfaces of the opening 314. The bushing 350 comprises a main portion 352 having an outer circumference 354, a first tab 364 that extends exterior to the outer circumference 354 of the main portion 352, and a second tab 368 that extends exterior to the outer circumference 354 of the main portion 352. A gap 362 is located between the first tab 364 and the second tab 368, and extends partially exterior to the outer circumference 354. An outer surface 366 of the first tab 364 rests against the first seating surface 322 and an outer surface 370 of the second tab 368 rests against the second seating surface 324. In this embodiment, the passage 320 extends through the top surface 318 of the tilter body 312 and terminates on the first seating surface 322. In alternate embodiments according to the present invention, the passage 320 could extend through the bottom surface 316 of the tilter body 312 and terminate on the second seating surface 324. In this embodiment, the first tab 364 and second tab 368 are identical in shape and size. In alternate embodiments, the first tab 364 and second tab 368 could be of different shapes and/or sizes.

In this embodiment, when the threaded member 330 is extended further into the opening 314, an increased amount of force is imparted to the outer surface 366 of the first tab 364. Because the second tab 368 is in contact with the second seating surface 324 and the bushing 350 is otherwise captive within the opening 314, the bushing 350 is maintained in its desired non-aligned orientation with respect to the central axis 336 of the threaded shaft 334 of the threaded member 330. Furthermore, imparting force to or withdrawing force from the outer surface 366 of the first tab 364 will cause the outer circumference 354 to change in size. For example, when an increased amount of force is imparted to the outer surface 366 of the first tab 364 by rotating the threaded member 330 such that it extends further into the opening 314, the size of the gap 362 decreases, thus reducing the size of the outer circumference 354. The bushing 350 further comprises an interior surface 356 that engages an exterior surface 344 of a friction cylinder 340 that is routed interior to the bushing 350 along an axis of rotation 315.

In this embodiment, the friction cylinder 340 comprises a knurled end portion 342 that fixedly engages the center tilt mount 328 such that the friction cylinder 340 and center tilt mount 328 are collectively rotatable about the axis of rotation 315. As noted above, a user device having a particular mass is attached to the center tilt mount 328, and the threaded member 330 is tightened against the outer surface 366 of the first tab 364 until a sufficient amount of force is applied to the friction cylinder 340 by the bushing 350 to adequately support the mass of the user device.

In this embodiment, the central axis 336 of the threaded shaft 334 of the threaded member 330 that comes into contact with the first tab 364 of the bushing 350 does not intersect with any portion of the outer circumference 354 of the main portion 352 of the bushing 350. In other words, the location at which pressure is applied to the first tab 364 of the bushing 350 to grip the bushing 350 around the friction cylinder 340 is offset from the main portion 352 of the bushing 350. This geometry, coupled with the presence of the first seating surface 322 and second seating surface 324 which act to hold the non-annular bushing 350 in a preferred rotational orientation with respect to the threaded member 330, allows for much finer, more accurate, and more reliable adjustment of the friction that is applied to the friction cylinder 340 by the bushing 350. In alternate embodiments, the central axis 336 of the threaded shaft 334 could intersect with or even bisect the main portion 352 of the bushing 350, so long as the end face 338 of the threaded member 330 engages the first tab 364 or second tab 368 at an angle sufficient to adequately alter the size of the gap 362 in the bushing 350 to properly vary the amount of friction being applied to the friction cylinder 340. In the present embodiment, the central axis 336 is oriented at an orthogonal angle to the gap 362 in the bushing 350 when the threaded shaft 334 is extended through the passage 320. In alternate embodiments, the central axis 336 could be arranged at a non-orthogonal angle with respect to the gap 362 when the threaded shaft 334 is extended through the passage 320. For example, the central axis 336 could be arranged with respect to the gap 362 at an angle between 0-90 degrees, more preferably at an angle between 15-90 degrees, and most preferably at an angle between 30-90 degrees.

In this embodiment, the bushing 350 has a width 360 that is much larger in comparison to both the width 317 of the opening 314 and a width 346 of the friction cylinder 340 than the respective width ratios in the tilter assembly 210 according to the prior art. For example, in this embodiment the width 360 of the bushing 350 is greater than 50% of the width 346 of the friction cylinder 340 and equal to the width 317 of the opening 314. In alternate embodiments, the width 360 of the bushing 350 may be between 50-90% of the width 346 of the friction cylinder 340 and/or the width 360 of the bushing 350 may be between 75-100% of the width 317 of the opening 314 in the tilter body 312.

Figure 16:
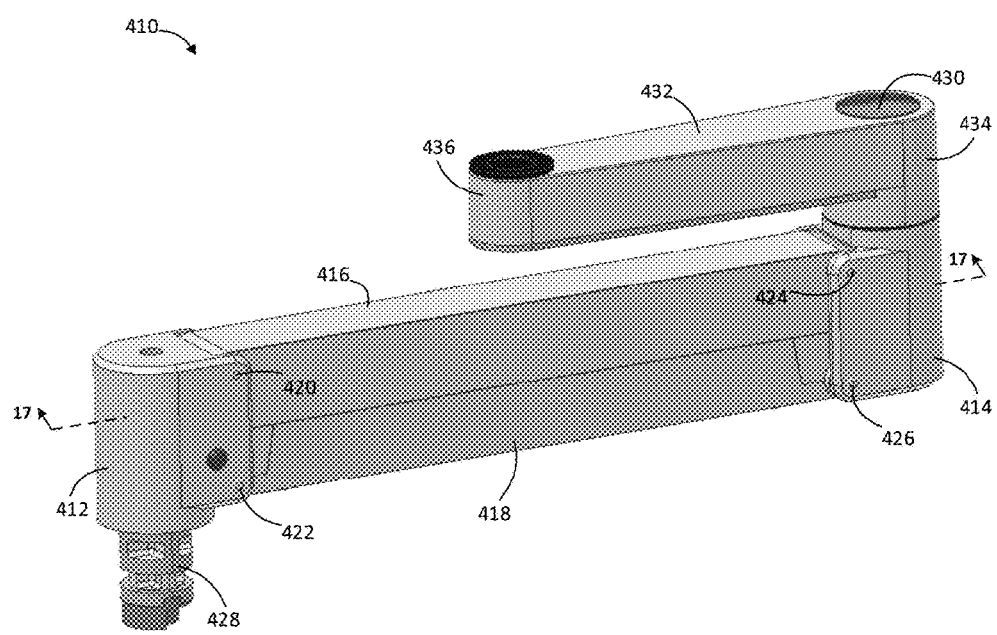
FIG. 16 is a perspective view of a support arm constructed in accordance with an additional embodiment of the present invention.
Figure 17:
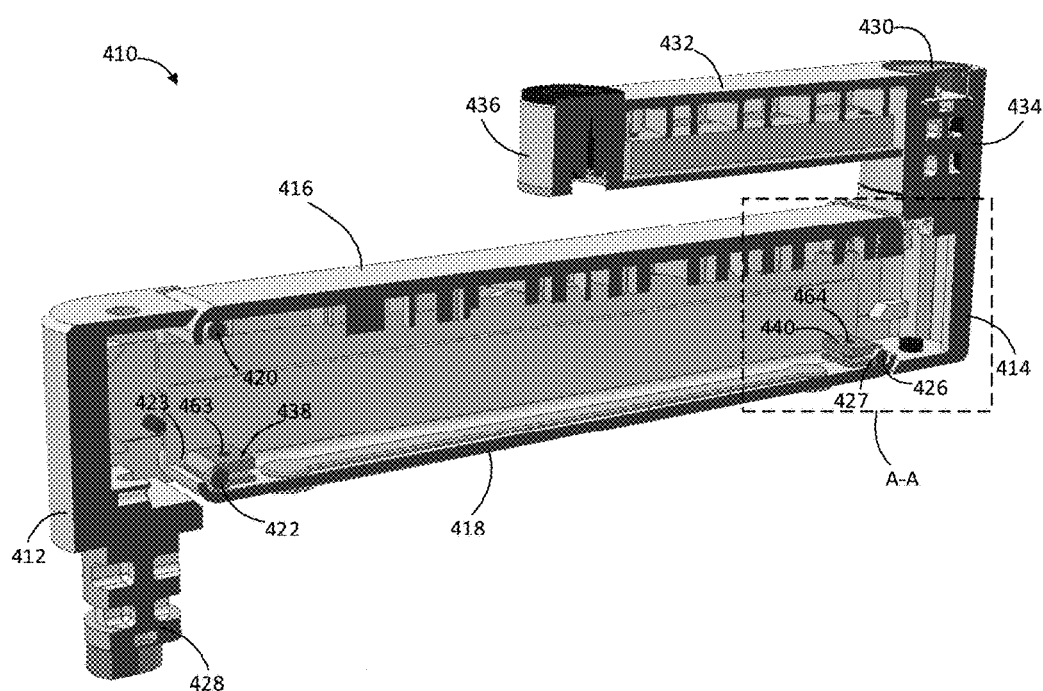
FIG. 17 is a cross-sectional view of the support arm shown in FIG. 16 taken along line 17-17.
Figure 18:
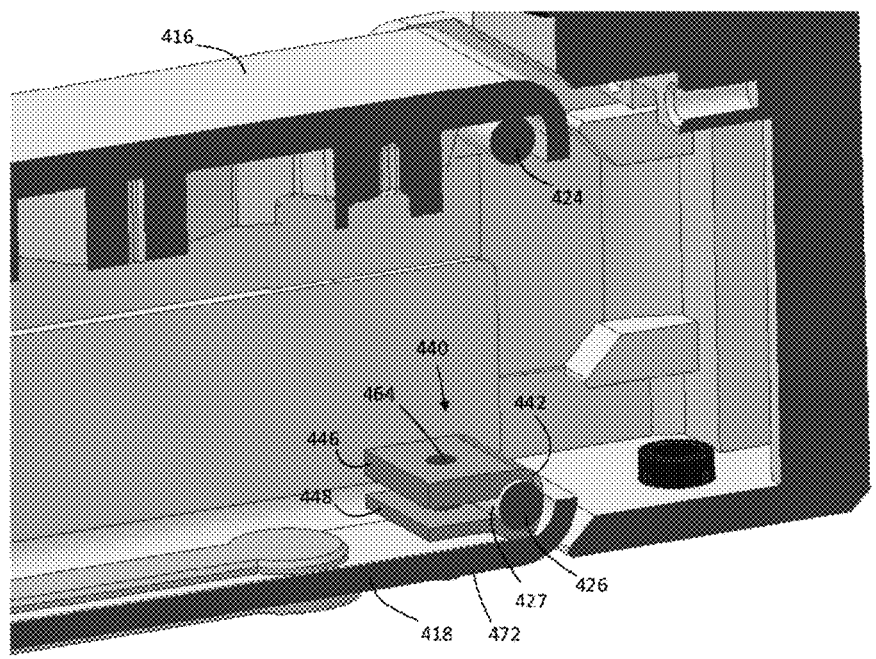
FIG. 18 is an enlarged view of the cross-sectional view shown in FIG. 17 taken at section A-A.
Figure 19:
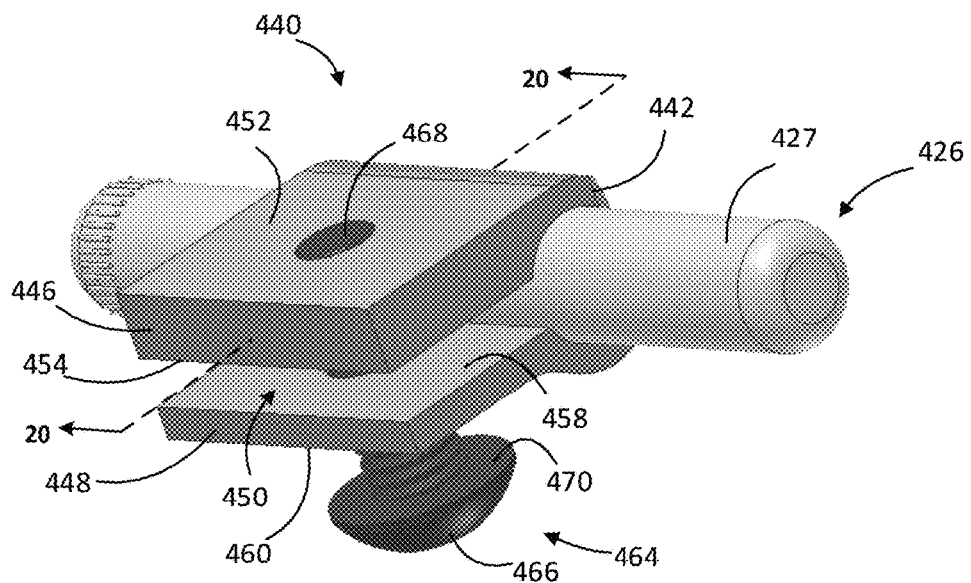
FIG. 19 is a perspective view of a bushing and axle combination shown in FIG. 18.
Figure 20:
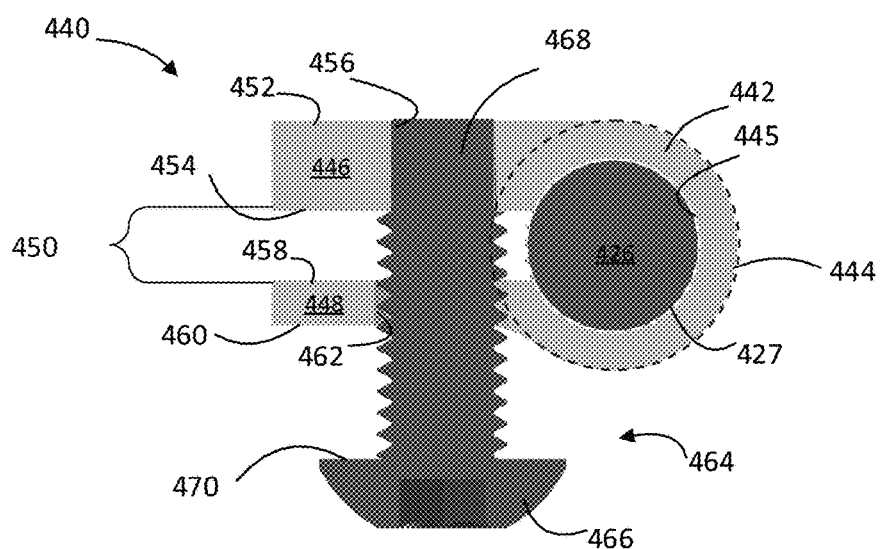
FIG. 20 is a cross-sectional view of the bushing and axle combination shown in FIG. 19 taken along line 20-20.

FIGS. 16-20 illustrate a support arm 410 constructed in accordance with another embodiment of the present invention. With reference to FIG. 16, the support arm 410 has a first endcap 412 and a second endcap 414 that are each rotatably attached to upper channel member 416 and lower channel member 418, which function as parallel support bars. The upper and lower channel members 416,418 are rotatably connected to the first endcap 412 at upper and lower first end axles 420,422 and to the second endcap 414 at upper and lower second end axles 424,426. In this regard, the upper and lower first end axles 420,422 are affixed to the first endcap 412 such that they do not move or rotate relative to the first endcap 412, and the upper and lower second end axles 424, 426 are affixed to the second endcap 414 such that they do not move or rotate relative to the second endcap 414. The connections between the first and second endcaps 412,414, on the one hand, and the upper and lower channel members 416,418, on the other, are such that when the second endcap 414 is moved in any direction relative to the first endcap 412, the upper and lower channel members 416,418 remain oriented parallel to each other while the first and second endcaps 412,414 likewise remain oriented parallel to each other. This forms a "four-bar parallelogram linkage," as known in the relevant art.

The first endcap 412 also includes a support post 428 that extends downwardly from the first endcap 412 and is configured to attach to a support base (not shown) for the support arm 410. The support base could be any known type of base mount or coupling as known in the art or hereafter developed. The second endcap 414 includes a forearm post 430 extending upwardly from the second endcap 414, and a forearm 432 is attached to the forearm post 430. The forearm 432 has a post end 434 that is rotatably attached to the forearm post 430 such that the forearm 432 is able to rotate about the forearm post 430. The forearm 432 also includes a mount end 436 that is configured to attach to a device mount (not shown), which could be, for example, any form of tilter discussed above or any type of device mount known in the art or hereafter developed.

Turning to FIGS. 17-20, the lower first end axle 422 and lower second end axle 426 are friction cylinders similar to those discussed above, having respective outer surfaces 423,427 around which first bushing 438 and second bushing 440 are attached, respectively. The first and second bushings 438,440 are similar in shape and function with respect to their interactions with the respective lower first end and lower second end axles 422,426. Accordingly, while the present disclosure will discuss the features of both the first bushing 438 and the second bushing 440 by referencing the second bushing 440 shown in FIGS. 18-20, it should be understood that the features described herein regarding the second bushing 440 equally apply to those of the first bushing 438. It should also be understood that bushings having the structure of the second bushing 440 could be provided on only a single axle of the upper and lower channel members 416,418, or could be located on the upper first end axle 420 and/or upper second end axle 424.

In this embodiment, the second bushing 440 has a main portion 442 having an outer circumference 444 (shown by a dashed line circle in FIG. 20), a first tab 446 that extends from the outer circumference 444 of the main portion 442, and a second tab 448 that also extends from the outer circumference 444 of the main portion 442. In this embodiment, the first tab 446 is tangent to the outer circumference 444 of the main portion 442 and the second tab 448 is offset inwardly with respect to the outer circumference 444, although in alternate embodiments the tabs could be shaped differently without departing from the scope of the present invention. The main portion 442 also includes an inner circumference 445 that wraps around and contacts the outer surface 427 of the lower second end axle 426. The first tab 446 is located proximate to the second tab 448 with a gap 450 located between the first tab 446 and the second tab 448, and both tabs 446,448 extending partially exterior to the outer circumference 444. The first tab 446 has an exterior surface 452, an interior surface 454, and a bore 456 extending through the first tab 446 between the interior surface 454 and the exterior surface 452. Likewise, the second tab 448 has an interior surface 458, an exterior surface 460, and a bore 462 extending through the second tab 448 between the interior surface 454 and the exterior surface 452.

A threaded member 464 (a screw, in this embodiment) that through the bottom wall of the lower channel member 418 connects the first and second tabs 446,448. In this embodiment, the threaded member 464 includes a head portion 466 and a threaded shaft 468, wherein the head portion 466 is located on the outside of the lower channel member 418 and the shaft 468 engages and passes through the lower channel member 418, the bore 456, and the bore 462. The head portion 466 of the threaded member 464 includes an outer rim 470 that abuts the outer surface 472 of the lower channel member 418. This relationship between the threaded member 464 and the lower channel member 418 will be discussed in greater detail below.

The bores 456,462 are configured such that when the threaded member 464 rotates about its axis in one direction, the first tab 446 is brought closer to the second tab 448, thereby shrinking the gap 450 between the first and second tabs 446, 448. This action shrinks the inner circumference 445 of the main portion 442, thereby tightening the grip of the main portion 442 of the second bushing 440 around the outer surface 427 of the lower second end axle 426 and increasing the friction between the inner circumference 445 of the second bushing 440 and the outer surface 427 of the lower second end axle 426. Conversely, when the threaded member 464 rotates about its axis in an opposite direction, the first tab 446 is moved away from the second tab 448, thereby expanding the gap 450 between the first and second tabs 446, 448, thus expanding the inner circumference 445 of the main portion 442 of the second bushing 440, which loosens the grip of the main portion 442 around the outer surface 427 of the lower second end axle 426 and decreases the friction between the inner circumference 445 of the second end bushing 440 and the outer surface 427 of the lower second end axle 426.

In one embodiment, the shaft 468 of the threaded member 464 is affixed to the bore 456 such that the shaft 468 cannot move vertically relative to the bore 456 but can freely rotate within the bore 456, while the bore 462 is threaded such that it moves along the shaft 468 when the threaded member 464 rotates. As the threaded member 464 rotates, the second tab 448 moves toward the first tab 446, which is immobile, creating the contracting action of the main portion 442 of the second bushing 440. In another embodiment, the contracting action occurs by having the bore 456 be threaded while the bore 462 is not, and the exterior surface 460 of the second tab 448 impinges on the lower channel member 418, which applies a normal force to the second tab 448. As the threaded member 464 rotates, the first tab 446 is pulled downwardly toward the second tab 448 and the normal force applied to the second tab 448 by the lower channel member 418 forces the second tab 448 toward the first tab 446.

In this embodiment, the exterior surface 452 of the first tab 446 (which is planar) and the exterior surface 460 of the second tab 448 (which has a curved portion) have different shapes. In addition, the portion of the inner surface of the lower channel member 418 that is contacted by the second bushing 440 is non-linear and complementary in shape to the exterior surface 460 of the second tab 448. This is advantageous because it prevents the second bushing 440 from being installed incorrectly (e.g., with the exterior surface 452 of the first tab 446 facing downwardly.

Because the head portion 466 of the threaded member 464 is located outside of the lower channel member 418 with the outer rim 470 abutting the outer surface 472 of the lower channel member 418, the head portion 466 of the threaded member 464 acts as an anchor by immobilizing the position of the second bushing 440 relative to the lower channel member 418. Thus, when the main portion 442 of the second bushing 440 contracts around the lower second end axle 426 to the point where the friction between the inner circumference 445 of the main portion 442 of the second bushing 440 and the outer surface 427 of the lower second end axle 426 becomes so great that it arrests movement of the second bushing 440 about the lower second end axle 426, movement of the lower channel member 418 about the lower second end axle 426 likewise is arrested. In such circumstances, because of the arrangement of the connections between the upper and lower channel members 416,418 and the first and second endcaps 412,414, arresting the movement of the lower channel member 418 relative to the lower second end axle 426 effectively arrests the movement of both the upper and lower channel members 416,418 about both of their respective axles (i.e., movement of the lower channel member 418 about both the lower first end axle 422 and the lower second end axle 426 and movement of the upper channel member 416 about both the upper first end axle 420 and the upper second end axle 424). This allows a user to hold the positioning of the support arm 410 by simply rotating the threaded member 464 to contract the second bushing 440. Optionally, a user can likewise rotate a threaded member 463 connected to the first bushing 438 to contract the first bushing 438 around the outer surface 423 of the lower first end axle 422 to further ensure that movement of the support arm 410 is arrested.

The inventors of the present application have discovered that designing bushings so that they contact a larger percentage of the width of the friction cylinder permits materials other than metals to be used to construct the bushing, for example thermoplastics and nylon, resulting in large cost savings and quieter joint operation. In the embodiments shown in FIGS. 1-20 and 13-20, the bushings 70, 166, 350, 338, 340, 438, 440 are formed of a polyoxymethylene acetal polymer, which is sold by different companies in various formulations as either a homopolymer or copolymer, for example under the name Delrin® by E. I. du Pont de Nemours and Company of Wilmington, Del., U.S.A. In alternate embodiments according to the present invention, suitable metal bushings could also be used.

The inventors have also discovered that the use of an bushing 70,166,350,438,440 that is elongated resulted in frictional forces being much more evenly provided by the bushing 70,166,350,438,440 along the width of the friction cylinders 28,160,340 or axles 422,426, leading to much quieter operation and greatly improved wear performance without any reduction in maximum weight capacity of the device. In accordance with the present invention, the width of the respective bushing 70,166,350 is preferably at least 75% of the width of the respective opening 18,100,314 in the lower endcap 16 or tilter body 94,312, is more preferably at least 90% of the width of the respective opening 18,100,314 in the lower endcap 16 or tilter body 94,312, and most preferably is equal to the width of the opening 18,100,314 in the lower endcap 16 or tilter body 94,312. Further, in accordance with the present invention, the width of the respective bushing 70,166,350,438,440 is preferably at least 50% of a width of the respective friction cylinder 28,160, 340 or axles 422,426, more preferably approximately 66.7% of a width of the respective friction cylinder 28,160,340 or axle 422,426, and most preferably at least 75% of the width of the respective friction cylinder 28,160,340 or axle 422, 426.

The inventors have also discovered that providing bushings 70,166,350,438,440 that are not circular in cross section allows for the rotational orientation of the bushings 70,166, 350,438,440 to be fixed with respect to the respective threaded member 64,186,464 or adjustment knob 330, thus preventing the gap 76,176,362,450 of the respective bushing 70,166,350,440 from rotating out of a desirable non-aligned orientation with respect to the threaded member 64,186,464 or adjustment knob 330. This also greatly reduces the likelihood of joint failure over time and improves the functioning of the joint by ensuring that movement of the respective threaded member 64,186,464 or adjustment knob 330 always acts to adjust the size of the respective gap 76,176,362,450 of the bushings 70,166,350,440.

While the principles of the invention have been described above in connection with preferred embodiments, it is to be clearly understood that this description is made only by way of example and not as a limitation of the scope of the invention.

Further Aspects of the Invention

Further aspects of the invention include:

Aspect 1. A support arm for supporting an electronic device, the support arm comprising: a base portion that is adapted to support the support arm from a mounting surface; a lower arm portion comprising a parallelogram portion, the parallelogram portion comprising an upper channel, a lower channel, a lower endcap, and an upper endcap, wherein a first end of the upper channel and a first end of the lower channel are each rotatably attached to the lower endcap and a second end of the upper channel and a second end of the lower channel are each rotatably attached to the upper endcap; a tilter assembly, the tilter assembly comprising a tilter body, a cylinder, and a center tilt mount that is rotatably attached to the tilter body via the cylinder, the center tilt mount being adapted to support the electronic device therefrom; and at least one friction joint, the at least one friction joint comprising: a bushing comprising a main portion having an exterior surface, an interior surface, and an outer circumference, the bushing further comprising a first tab, a second tab, and a split located between the first and second tabs, wherein at least one of the first tab and second tab extends at least partially exterior to the outer circumference of the main portion of the bushing; a friction cylinder comprising an exterior surface and at least one portion that fixedly engages with a separate component of the support arm; an opening for accommodating the bushing and friction cylinder therein; a threaded passage that intersects with the opening; and a threaded member that is extendable through the threaded passage and into the opening, the bushing being located within the opening such that the exterior surface of the main portion of the bushing engages the opening, the friction cylinder being located within the opening and routed internal to the bushing such that the exterior surface of the friction cylinder engages the interior surface of the main portion of the bushing, the friction cylinder being rotatable along with the separate component of the support arm within the opening, the threaded member being extendable into the opening such that the threaded member makes contact with one of the first tab and the second tab of the bushing, wherein the at least one friction joint is located within at least one of the lower endcap, upper endcap, and tilter assembly, wherein if the at least one friction joint is located within either of the lower endcap and upper endcap, the separate component is at least one of the upper channel and lower channel, and wherein if the at least one friction joint is located within the tilter assembly, the opening and threaded passage are located in the tilter body, the cylinder corresponds with the friction cylinder, and the separate component is the center tilt mount.

Aspect 2. The support arm of Aspect 1, wherein a first friction joint of the at least one friction joint is located within the lower endcap and a second friction joint of the at least one friction joint is located within the tilter assembly.

Aspect 3. The support arm of either of Aspect 1 and Aspect 2, wherein the threaded passage intersects with the opening at an orthogonal angle thereto.

Aspect 4. The support arm of any of Aspects 1-3, wherein at least a portion of each of the first tab and the second tab extend exterior to the outer circumference of the main portion of the bushing.

Aspect 5. The support arm of any of Aspects 1-4, wherein an entirety of at least one of the first tab and the second tab extends exterior to the outer circumference of the main portion of the bushing.

Aspect 6. The support arm of any of Aspects 1-5, the opening comprising at least one seating surface located exterior to the outer circumference of the main portion of the bushing, wherein one of the first tab and second tab is in contact with the at least one seating surface.

Aspect 7. The support arm of any of Aspects 1-6, the opening comprising a first seating surface and a second seating surface, the first and second seating surfaces located exterior to the outer circumference of the main portion of the bushing, wherein the first tab is in contact with the first seating surface and the second tab is in contact with the second seating surface, the interaction of the first tab with the first seating surface and the interaction of the second tab with the second seating surface preventing rotation of the bushing within the opening.

Aspect 8. The support arm of any of Aspects 1-7, the threaded member comprising a shaft having a central axis, wherein the central axis does not extend through any portion of the outer circumference of the main portion of the bushing when the threaded member is extended through the threaded passage.

Aspect 9. The support arm of any of Aspects 1-8, the threaded member comprising a shaft having a central axis, wherein the central axis is oriented at an orthogonal angle to the split in the bushing when the shaft is extended through the threaded passage.

Aspect 10. The support arm of any of Aspects 1-9, wherein the first tab and the second tab have different dimensions.

Aspect 11. The support arm of any of Aspects 1-10, wherein the bushing has a width and the opening has a width, and the width of the bushing is at least 75% of the width of the opening.

Aspect 12. The support arm of any of Aspects 1-11, wherein the bushing has a width and the opening has a width, and the width of the bushing is at least 90% of the width of the opening.

Aspect 13. The support arm of any of Aspects 1-12, wherein the bushing has a width and the opening has a width, and the width of the bushing is equal to the width of the opening.

Aspect 14. The support arm of any of Aspects 1-13, wherein the bushing has a width and the friction cylinder has a width, and the width of the bushing is at least 50% of the width of the friction cylinder.

Aspect 15. The support arm of Aspect 14, wherein the opening has a width and the width of the bushing is at least 75% of the width of the opening.

Aspect 16. The support arm of Aspect 14, wherein the opening has a width and the width of the bushing is at least 90% of the width of the opening.

Aspect 17. The support arm of Aspect 14, wherein the opening has a width and the width of the bushing is equal to the width of the opening.

Aspect 18. The support arm of any of Aspects 1-17, wherein the upper channel comprises a pair of stringers.

Aspect 19. A support arm, the support arm comprising: a base portion that is adapted to support the support arm from a mounting surface; a lower arm portion comprising a parallelogram portion, the parallelogram portion comprising an upper channel, a lower channel, a lower endcap, and an upper endcap, wherein a first end of the upper channel and a first end of the lower channel are rotatably attached to the lower endcap and a second end of the upper channel and a second end of the lower channel are rotatably attached to the upper endcap; and a tilter assembly, the tilter assembly comprising a tilter body, a friction cylinder, a bushing, and a threaded member, the tilter body having an opening and a threaded passage located therein, the threaded passage intersecting with the opening, the friction cylinder extending through the opening along an axis of rotation, the friction cylinder having an exterior surface and at least one portion that is engageable with a component that can support the electronic device therefrom, the friction cylinder being rotatable relative to the tilter body about the axis of rotation, the bushing located between the friction cylinder and the opening of the tilter body, the bushing having a main portion, a first tab, a second tab, and a split located between the first and second tabs, the main portion having an exterior surface that engages the opening in the tilter body, an interior surface that engages the exterior surface of the friction cylinder, and an outer circumference, at least one of the first tab and second tab extending at least partially exterior to the outer circumference of the main portion of the bushing, the threaded member being extendable through the threaded passage and into the opening of the tilter body such that the threaded member contacts one of the first tab and second tab.

Aspect 20. The support arm of Aspect 19, wherein at least a portion of each of the first tab and the second tab extend exterior to the outer circumference of the main portion of the bushing.

Aspect 21. The support arm of either of Aspect 19 and Aspect 20, wherein an entirety of at least one of the first tab and the second tab extends exterior to the outer circumference of the main portion of the bushing.

Aspect 22. The support arm of any of Aspects 19-21, the opening of the tilter body comprising at least one seating surface located exterior to the outer circumference of the main portion of the bushing, wherein one of the first tab and second tab is in contact with the at least one seating surface.

Aspect 23. The support arm of any of Aspects 19-22, the opening of the tilter body comprising a first seating surface and a second seating surface, the first and second seating surfaces located exterior to the outer circumference of the main portion of the bushing, wherein the first tab is in contact with the first seating surface and the second tab is in contact with the second seating surface, the interaction of the first tab with the first seating surface and the interaction of the second tab with the second seating surface preventing rotation of the bushing within the opening.

Aspect 24. The support arm of any of Aspects 19-23, the threaded member comprising a shaft having a central axis, wherein the central axis does not extend through any portion of the outer circumference of the main portion of the bushing when the threaded member is extended through the threaded passage.

Aspect 25. The support arm of any of Aspects 19-24, the threaded member comprising a shaft having a central axis, wherein the central axis is oriented at an orthogonal angle to the split in the bushing when the shaft is extended through the threaded passage.

Aspect 26. The support arm of any of Aspects 19-25, wherein the first tab and the second tab have different dimensions.

Aspect 27. The support arm of any of Aspects 19-26, wherein the component is a center tilt mount that is fixedly engageable with the friction cylinder such that the friction cylinder and the center tilt mount are collectively rotatable relative to the tilter body about the axis of rotation.

Aspect 28. The support arm of any of Aspects 19-27, wherein the bushing has a width and the opening in the tilter body has a width, and the width of the bushing is at least 75% of the width of the opening.

Aspect 29. The support arm of any of Aspects 19-28, wherein the bushing has a width and the opening in the tilter body has a width, and the width of the bushing is at least 90% of the width of the opening.

Aspect 30. The support arm of any of Aspects 19-29, wherein the bushing has a width and the opening in the tilter body has a width, and the width of the bushing is equal to the width of the opening.

Aspect 31. The support arm of any of Aspects 19-30, wherein the bushing has a width and the friction cylinder has a width, and the width of the bushing is at least 50% of the width of the friction cylinder.

Aspect 32. The support arm of Aspect 31, wherein the opening in the tilter body has a width and the width of the bushing is at least 75% of the width of the opening.

Aspect 33. The support arm of Aspect 31, wherein the opening in the tilter body has a width and the width of the bushing is at least 90% of the width of the opening.

Aspect 34. The support arm of Aspect 31, wherein the opening in the tilter body has a width and the width of the bushing is equal to the width of the opening.

Aspect 35. A support arm, the support arm comprising: a base portion that is adapted to support the support arm from a mounting surface; a lower arm portion comprising a parallelogram portion, the parallelogram portion comprising an upper channel, a lower channel, a lower endcap, an upper endcap, and an extension and retraction device, a first end of the upper channel being rotatably attached to the lower endcap at a first joint, a first end of the lower channel being rotatably attached to the lower endcap at a second joint, a second end of the upper channel being rotatably attached to the upper endcap at a third joint, and a second end of the lower channel being rotatably attached to the upper endcap at a fourth joint, a first end of the extension and retraction device being attached to the lower endcap and a second end of the extension retraction device being attached to the lower channel, wherein at least one of the first joint and the second joint comprises a friction joint, the lower endcap having a threaded passage therein; and a device mount coupled to the lower arm portion, the device mount being adapted to support an electronic display device therefrom; wherein the friction joint comprises an opening located in the lower endcap, a friction cylinder, a bushing, and a threaded member, the threaded passage intersects with the opening, the friction cylinder extends through the opening along an axis of rotation that corresponds with the respective one of the first joint and the second joint, the friction cylinder having an exterior surface and at least one portion that is engageable with the upper channel or lower channel, the friction cylinder being rotatable relative to the lower endcap about the axis of rotation, the bushing is located between the friction cylinder and the opening, the bushing having a main portion, a first tab, a second tab, and a split located between the first and second tabs, the main portion having an exterior surface that engages the opening in the lower endcap, an interior surface that engages the exterior surface of the friction cylinder, and an outer circumference, at least one of the first tab and second tab extending at least partially exterior to the outer circumference of the main portion of the bushing, the threaded member being extendable through the threaded passage and into the opening such that the threaded member contacts one of the first tab and second tab.

Aspect 36. The support arm of Aspect 35, further comprising a forearm, the forearm being attached at a first end to the upper endcap and at a second end to the device mount.

Aspect 37. The support arm of either of Aspect 35 and Aspect 36, wherein at least a portion of each of the first tab and the second tab extend exterior to the outer circumference of the main portion of the bushing.

Aspect 38. The support arm of any of Aspects 35-37, wherein an entirety of at least one of the first tab and the second tab extends exterior to the outer circumference of the main portion of the bushing.

Aspect 39. The support arm of any of Aspects 35-38, the opening of the tilter body comprising at least one seating surface located exterior to the outer circumference of the main portion of the bushing, wherein one of the first tab and second tab is in contact with the at least one seating surface.

Aspect 40. The support arm of any of Aspects 35-39, the opening of the tilter body comprising a first seating surface and a second seating surface, the first and second seating surfaces located exterior to the outer circumference of the main portion of the bushing, wherein the first tab is in contact with the first seating surface and the second tab is in contact with the second seating surface, the interaction of the first tab with the first seating surface and the interaction of the second tab with the second seating surface preventing rotation of the bushing within the opening.

Aspect 41. The support arm of any of Aspects 35-40, the threaded member comprising a shaft having a central axis, wherein the central axis does not extend through any portion of the outer circumference of the main portion of the bushing when the threaded member is extended through the threaded passage.

Aspect 42. The support arm of any of Aspects 35-41, the threaded member comprising a shaft having a central axis, wherein the central axis is oriented at an orthogonal angle to the split in the bushing when the shaft is extended through the threaded passage.

Aspect 43. The support arm of any of Aspects 35-42, wherein the first tab and the second tab have different dimensions.

Aspect 44. A tilter for supporting an electronic device, the tilter comprising: a tilter body, the tilter body having an opening and a threaded passage located therein, the threaded passage intersecting with the opening; a friction cylinder extending through the opening along an axis of rotation, the friction cylinder having an exterior surface and at least one portion that is engageable with a component that can support the electronic device therefrom, the friction cylinder being rotatable relative to the tilter body about the axis of rotation; a bushing located between the friction cylinder and the opening of the tilter body, the bushing having a main portion, a first tab, a second tab, and a split located between the first and second tabs, the main portion having an exterior surface that engages the opening in the tilter body, an interior surface that engages the exterior surface of the friction cylinder, and an outer circumference, at least one of the first tab and second tab extending at least partially exterior to the outer circumference of the main portion of the bushing; and a threaded member that is extendable through the threaded passage and into the opening of the tilter body such that the threaded member contacts one of the first tab and second tab.

Aspect 45. The tilter of Aspect 44, wherein at least a portion of each of the first tab and the second tab extend exterior to the outer circumference of the main portion of the bushing.

Aspect 46. The tilter of either of Aspect 44 and Aspect 45, wherein an entirety of at least one of the first tab and the second tab extends exterior to the outer circumference of the main portion of the bushing.

Aspect 47. The tilter of any of Aspects 44-46, the opening of the tilter body comprising at least one seating surface located exterior to the outer circumference of the main portion of the bushing, wherein one of the first tab and second tab is in contact with the at least one seating surface.

Aspect 48. The tilter of any of Aspects 44-47, the opening of the tilter body comprising a first seating surface and a second seating surface, the first and second seating surfaces located exterior to the outer circumference of the main portion of the bushing, wherein the first tab is in contact with the first seating surface and the second tab is in contact with the second seating surface, the interaction of the first tab with the first seating surface and the interaction of the second tab with the second seating surface preventing rotation of the bushing within the opening.

Aspect 49. The tilter of any of Aspects 44-48, the threaded member comprising a shaft having a central axis, wherein the central axis does not extend through any portion of the outer circumference of the main portion of the bushing when the threaded member is extended through the threaded passage.

Aspect 50. The tilter of any of Aspects 44-49, the threaded member comprising a shaft having a central axis, wherein the central axis is oriented at an orthogonal angle to the split in the bushing when the shaft is extended through the threaded passage.

Aspect 51. The tilter of any of Aspects 44-50, wherein the first tab and the second tab have different dimensions.

Aspect 52. The tilter of any of Aspects 44-51, wherein the component is a center tilt mount that is fixedly engageable with the friction cylinder such that the friction cylinder and the center tilt mount are collectively rotatable relative to the tilter body about the axis of rotation.

Aspect 53. The tilter of any of Aspects 44-52, wherein the bushing has a width and the opening in the tilter body has a width, and the width of the bushing is at least 75% of the width of the opening.

Aspect 54. The tilter of any of Aspects 44-53, wherein the bushing has a width and the opening in the tilter body has a width, and the width of the bushing is at least 90% of the width of the opening.

Aspect 55. The tilter of any of Aspects 44-54, wherein the bushing has a width and the opening in the tilter body has a width, and the width of the bushing is equal to the width of the opening.

Aspect 56. The tilter of any of Aspects 44-55, wherein the bushing has a width and the friction cylinder has a width, and the width of the bushing is at least 50% of the width of the friction cylinder.

Aspect 57. The tilter of Aspect 56, wherein the opening in the tilter body has a width, and the width of the bushing is at least 75% of the width of the opening.

Aspect 58. The tilter of Aspect 56, wherein the opening in the tilter body has a width, and the width of the bushing is at least 90% of the width of the opening.

Aspect 59. The tilter of Aspect 56, wherein the opening in the tilter body has a width, and the width of the bushing is equal to the width of the opening.

Aspect 60. A tilter comprising: a tilter body, the tilter body having an opening and a passage located therein, the passage intersecting with the opening; a friction cylinder extending through the opening along an axis of rotation, the friction cylinder having an exterior surface and being rotatable relative to the tilter body about the axis of rotation; a bushing located between the friction cylinder and the opening of the tilter body, the bushing having a main portion, a first tab, a second tab, and a split located between the first and second tabs, the main portion having an exterior surface that engages the opening in the tilter body, an interior surface that engages the exterior surface of the friction cylinder, and an outer circumference, at least one of the first tab and the second tab extending at least partially exterior to the outer circumference of the main portion of the bushing and the split extending at least partially exterior to the outer circumference of the main portion of the bushing; and a pressure-supplying member that is extendable through the passage and into the opening of the tilter body such that the pressure-supplying member contacts one of the first tab and second tab.

Aspect 61. The tilter of Aspect 60, wherein the passage is threaded and the pressure supplying-member is a threaded member.

The invention claimed is:

1. A support arm comprising:
at least one channel having an axis of rotation; and
a friction joint comprising a cylinder, a bushing, a threaded member, and an opening through which the threaded member may be routed such that it contacts at least a portion of the bushing, the cylinder extending along the axis of rotation, the cylinder having an exterior surface and at least one portion that is fixedly engaged with the at least one channel, the bushing having a main portion, a first tab, a second tab, and a split located between the first and second tabs, the main portion having an exterior surface, an interior surface that engages the exterior surface of the cylinder, and an outer circumference that corresponds with the exterior surface thereof, at least one of the first tab and the second tab extending at least partially exterior to the outer circumference of the main portion of the bushing, the threaded member being extendable through the opening such that the threaded member contacts one of the first tab and second tab.

2. The support arm of claim 1, wherein rotation of the threaded member in a first rotational direction increases the size of the split located between the first and second tabs and wherein rotation of the threaded member in a second rotational direction decreases the size of the split located between the first and second tabs, wherein the first and second rotational directions are opposite.

3. The support arm of claim 1, wherein at least a portion of each of the first tab and the second tab extend exterior to the outer circumference of the main portion of the bushing.

4. The support arm of claim 3, wherein an entirety of at least one of the first tab and the second tab extends exterior to the outer circumference of the main portion of the bushing.

5. The support arm of claim 1, the threaded member comprising a shaft having a central axis, wherein the central axis does not extend through any portion of the outer circumference of the main portion of the bushing when the threaded member is extended through the opening.

6. The support arm of claim 1, wherein the opening includes threading that complements the threaded member.

7. The support arm of claim 1, wherein the opening is located in the at least one channel.

8. The support arm of claim 7, wherein the opening includes threading that complements the threaded member.

9. The support arm of claim 1, wherein at least one of the first tab and second tab includes a hole therein, the hole being adapted to receive the threaded member therein.

10. The support arm of claim 9, the hole including threading that complements the threaded member.

11. The support arm of claim 1, wherein the first tab includes a first hole therein and the second tab includes a second hole therein, wherein one of the first hole and second hole is unthreaded and the other of the first hole and second hole includes threading that complements the threaded member.

12. The support arm of claim 1, wherein the bushing has a width measured along the axis of rotation of the at least one channel and the cylinder has a width measured along the axis of rotation of the at least one channel, and the width of the bushing is at least 50% of the width of the cylinder.

13. The support arm of claim 1, further comprising a base portion attached to a first end of the at least one channel, the base portion being adapted to support the support arm from a mounting surface.

14. The support arm of claim 13, further comprising a device support attached to a second end of the at least one channel, the second end opposing the first end, the device support being adapted to support an electronic device therefrom.

15. The support arm of claim 13, further comprising a device support attached to an end of the at least one channel, the device support being adapted to support an electronic device therefrom.

* * * * *